United States Patent

Yamada et al.

[11] Patent Number: 5,903,112
[45] Date of Patent: *May 11, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata, Aichi-ken; Akihiko Kanamori, Okazaki, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,556

[22] Filed: Apr. 26, 1996

[30] Foreign Application Priority Data

May 19, 1995 [JP] Japan .................................. 7-145575
Sep. 22, 1995 [JP] Japan .................................. 7-269242

[51] Int. Cl.⁶ .............................. H02K 51/00; B60K 1/00
[52] U.S. Cl. .............................. 318/10; 318/139; 318/50; 477/179; 180/65.3
[58] Field of Search .................................. 315/9, 10, 11, 315/376, 379, 50, 381, 280, 366, 49, 78, 79, 76, 87, 139; 477/5, 7, 15, 20, 30; 180/65.3, 65.4, 65.2, 65.5; 310/101, 102 R, 107, 92, 108, 109

[56] References Cited

U.S. PATENT DOCUMENTS

| | | |
|---|---|---|
| 3,623,568 | 11/1971 | Mori . |
| 3,683,249 | 8/1972 | Shibata . |
| 3,789,281 | 1/1974 | Shibata . |
| 3,866,703 | 2/1975 | Eastham ................................. 180/65.1 |
| 4,309,620 | 1/1982 | Bock ..................................... 180/65.2 |
| 4,335,429 | 6/1982 | Kawakatsu ............................. 180/65.2 |
| 5,085,101 | 2/1992 | Oldfield ................................ 74/730.1 |
| 5,498,216 | 3/1996 | Bitsche et al. .......................... 477/20 |
| 5,501,641 | 3/1996 | Kollermeyer et al. .................. 475/107 |
| 5,635,805 | 6/1997 | Ibaraki et al. .......................... 318/139 |
| 5,637,987 | 6/1997 | Fattic et al. ............................ 180/65.3 |
| 5,644,200 | 7/1997 | Yang ...................................... 318/139 |
| 5,720,690 | 2/1998 | Hara et al. .............................. 180/65.2 |

FOREIGN PATENT DOCUMENTS

| | | |
|---|---|---|
| 58401/73 | 1/1975 | Australia . |
| 0 771 687 A1 | 5/1977 | European Pat. Off. . |
| 0 725 474 | 8/1996 | European Pat. Off. . |
| 0 725 474 A1 | 8/1996 | European Pat. Off. . |
| 29 28 770 A1 | 1/1981 | Germany . |
| 30 25 756 A1 | 1/1982 | Germany . |
| 49-43311 | 4/1974 | Japan . |
| 53-133814 | 11/1978 | Japan . |
| 55-103100 | 8/1980 | Japan . |
| 1193965 | 6/1970 | United Kingdom . |

*Primary Examiner*—John W. Cabeca
*Attorney, Agent, or Firm*—Oliff & Berridge PLC

[57] ABSTRACT

A power output apparatus (20) of the present invention includes a clutch motor (30), an assist motor (40), and a controller (80) for controlling the clutch motor (30) and the assist motor (40). The clutch motor (30) includes an outer rotor (32) linked with a crankshaft (56) of a gasoline engine (50) and an inner rotor (34) connecting with a drive shaft (22). The assist motor (40) includes a rotor (42) connecting with the drive shaft (22). When the residual capacity of a battery (94) is less than an allowable minimum value, a control CPU (90) of the controller (80) controls a first driving circuit (91) to enable the clutch motor (30) to carry out the power operation and apply a first torque to the drive shaft (22) in the direction of rotation of the drive shaft (22). The control CPU (90) concurrently controls a second driving circuit (92) to enable the assist motor (40) to carry out the regenerative operation and apply a second torque to the drive shaft (22) in the reverse of the rotation of the drive shaft (22). The second torque is substantially equal in magnitude but opposite in direction to the first torque. The electric power regenerated by the assist motor (40) is supplied to the battery (94) to supplement the electric power of the battery (94). The power output apparatus (20) of the invention can thus make the torque output to the drive shaft (22) approximately equal to zero.

14 Claims, 25 Drawing Sheets

| RELATIONS OF REVOLVING SPEEDS | RESIDUAL CAPACITY OF BATTERY | ARRANGEMENT OF OPERATION | GASOLINE ENGINE | CLUTCH MOTOR | ASSIST MOTOR |
|---|---|---|---|---|---|
| NORMAL DRIVING STATE Ne > Nd | INSUFFICIENT BRM < Bmin | 1 | DRIVING OPERATION | REGENERATIVE OPERATION | REGENERATIVE OPERATION |
| | EXCESS BRM > Bmax | 2 | BRAKING OPERATION (ENGINE BRAKE) | POWER OPERATION | POWER OPERATION |
| HIGH-SPEED DRIVING STATE (OVERDRIVE STATE) Ne < Nd | INSUFFICIENT BRM < Bmin | 4 | DRIVING OPERATION | POWER OPERATION | REGENERATIVE OPERATION |
| | EXCESS BRM > Bmax | 5 | BRAKING OPERATION (ENGINE BRAKE) | REGENERATIVE OPERATION | POWER OPERATION |
| Ne = Nd | INSUFFICIENT BRM < Bmin | 6 | DRIVING OPERATION | LOCK-UP STATE | REGENERATIVE OPERATION |
| | EXCESS BRM > Bmax | 7 | BRAKING OPERATION (ENGINE BRAKE) | LOCK-UP STATE | POWER OPERATION |
| — | APPROPRIATE Bmin ≤ BRM ≤ Bmax | 3 | STOP WORKING OR IDLING STATE | STOP WORKING | STOP WORKING |

Fig. 24

| RELATIONS OF REVOLVING SPEEDS | RESIDUAL CAPACITY OF BATTERY | ARRANGEMENT OF OPERATION | GASOLINE ENGINE | CLUTCH MOTOR | ASSIST MOTOR |
|---|---|---|---|---|---|
| NORMAL DRIVING STATE $Ne > Nd$ | INSUFFICIENT $BRM < Bmin$ | 1 | DRIVING OPERATION | REGENERATIVE OPERATION | REGENERATIVE OPERATION |
| | EXCESS $BRM > Bmax$ | 2 | BRAKING OPERATION (ENGINE BRAKE) | POWER OPERATION | POWER OPERATION |
| HIGH-SPEED DRIVING STATE (OVERDRIVE STATE) $Ne < Nd$ | INSUFFICIENT $BRM < Bmin$ | 4 | DRIVING OPERATION | POWER OPERATION | REGENERATIVE OPERATION |
| | EXCESS $BRM > Bmax$ | 5 | BRAKING OPERATION (ENGINE BRAKE) | REGENERATIVE OPERATION | POWER OPERATION |
| $Ne = Nd$ | INSUFFICIENT $BRM < Bmin$ | 6 | DRIVING OPERATION | LOCK-UP STATE | REGENERATIVE OPERATION |
| | EXCESS $BRM > Bmax$ | 7 | BRAKING OPERATION (ENGINE BRAKE) | LOCK-UP STATE | POWER OPERATION |
| — | APPROPRIATE $Bmin \leq BRM \leq Bmax$ | 3 | STOP WORKING OR IDLING STATE | STOP WORKING | STOP WORKING |

5,903,112

POWER OUTPUT APPARATUS AND METHOD OF CONTROLLING THE SAME

BACKGROUND OF THE INVENTION

1. Field of the Invention

The present invention relates to a power output apparatus having an engine, a first motor, and a second motor and also to a method of controlling the same. More specifically, the present invention pertains to a power output apparatus, which can make the output torque of a drive shaft substantially equal to zero, as well as a method of controlling such a power output apparatus.

2. Description of the Related Art

Some proposed power output apparatuses for outputting power generated by an engine transmit the power through mechanical-electrical-mechanical conversion. For example, a power output apparatus disclosed in JAPANESE PATENT LAYING-OPEN GAZETTE No. 53-133814 couples an output shaft of an engine with a rotating shaft of a d.c. motor via an electromagnetic coupling to make the rotating shaft work as a drive shaft. The engine drives one rotor on the side of d.c. field winding of the electromagnetic coupling, while the other rotor on the side of a.c. armature winding drives the rotating shaft of the d.c. motor or the drive shaft. Electric power produced by a slip between the two rotors of the electromagnetic coupling is supplied from the rotor on the side of a.c. armature winding to the d.c. motor via a rectifier. The d.c. motor also receives electric power from a battery to rotate the drive shaft. Unlike conventional fluid-based torque converters, this proposed structure substantially has no energy loss due to the slip. It is accordingly possible to make the energy loss in the power transmission means relatively small by enhancing the efficiencies of the electromagnetic coupling and the d.c. motor.

In the proposed power output apparatus discussed above, however, the drive shaft is driven by the electromagnetic coupling and the d.c. motor, so that a certain magnitude of torque is continuously output from the drive shaft. The proposed structure does not take into account the operations when the output torque of the drive shaft is made approximately equal to zero.

SUMMARY OF THE INVENTION

One object of the present invention is thus to provide a power output apparatus, which can make the output torque of a drive shaft substantially equal to zero, as well as a method of controlling such a power output apparatus.

Another object of the present invention is to provide a power output apparatus, which can supply electric power to storage means for storing electric power, such as a battery, or alternatively consume the electric power stored in the storage means, when the output torque of the drive shaft is made approximately equal to zero, as well as a method of controlling such a power output apparatus.

The above and the other related objects are realized by a first power output apparatus for outputting power to a drive shaft.

The first power output apparatus comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors, the first motor applying a first torque to the drive shaft; first motor-driving means for exchanging electric currents with the first motor to vary the electromagnetic coupling of the first rotor with the second rotor; a second motor comprising a stator and a third rotor connected with the drive shaft, the stator being electromagnetically coupled with the third rotor, the second motor applying a second torque to the drive shaft; second motor-driving means for exchanging electric currents with the second motor to vary the electromagnetic coupling of the stator with the third rotor; and control means for controlling the first and second motor-driving means to adjust the first and second torques, so that the second torque is substantially equal in magnitude in opposite direction to the first torque.

In the structure of the first power output apparatus, the second torque is substantially equal in magnitude but opposite in direction to the first torque, so that the first torque and the second torque cancel each other on the drive shaft. Therefore the structure can make the output torque of the drive shaft approximately equal to zero.

In accordance with one aspect of the present invention, the control means comprises means for controlling the first motor-driving means to enable the first motor to regenerate electric power, and controlling the second motor-driving means to enable the second motor to regenerate electric power.

This structure can make the output torque of the drive shaft approximately equal to zero while enabling the first motor and the second motor to regenerate electric power. This structure is especially suitable for the cases requiring strong electric power.

In accordance with another aspect of the present invention, the first power output apparatus further comprises: storage means for storing electric power; and wherein the control means comprises means for controlling the first motor-driving means to supply the electric power stored in the storage means to the first motor in order to activate the first motor, and controlling the second motor-driving means to supply the electric power stored in the storage means to the second motor in order to activate the second motor.

This structure can make the output torque of the drive shaft approximately equal to zero while driving the first motor and the second motor with the electric power stored in the storage means. This structure consumes the electric power in the storage means and is thus suitable for the cases that the storage means has an excess residual capacity of electric power.

In accordance with still another aspect of the present invention, wherein the control means comprises means for controlling the second motor-driving means to enable the second motor to regenerate electric power, and controlling the first motor-driving means to supply the regenerated electric power to the first motor in order to activate the first motor.

This structure can make the output torque of the drive shaft approximately equal to zero. The electric power regenerated by the second motor is primarily consumed by the first motor, while the remaining electric power may be used for another purpose.

In accordance with still another aspect of the present invention, the first power output apparatus further comprises: storage means for storing electric power; and wherein the control means comprises means for controlling the first motor-driving means to enable the first motor to regenerate electric power, and controlling the second motor-driving means to supply the regenerated electric power and the electric power stored in the storage means to the second motor in order to activate the second motor.

This structure can make the output torque of the drive shaft approximately equal to zero. The second motor is driven with the electric power stored in the storage means as well as the regenerated electric power. This structure consumes the electric power in the storage means and is thus suitable for the cases that the storage means has an excess residual capacity of electric power.

According to another aspect of the present invention, a second power output apparatus for outputting power to a drive shaft comprises: an engine having an output shaft and applying a first torque to the output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the drive shaft, the stator being electromagnetically coupled with the third rotor, the second motor applying a second torque to the drive shaft; second motor-driving means for exchanging electric currents with the second motor to vary the electromagnetic coupling of the stator with the third rotor; and control means for controlling the first motor-driving means to electromagnetically lock up the first rotor relative to the second rotor of the first motor and thereby allow the output shaft of the engine to rotate with the drive shaft in a substantially integral manner, and controlling the second motor-driving means to enable the second motor to regenerate electric power, the second torque being substantially equal in magnitude in opposite direction to the first torque.

The structure of the second power output apparatus can make the output torque of the drive shaft approximately equal to zero while enabling the second motor to regenerate electric power. This structure is especially suitable for the cases requiring additional electric power.

According to still another aspect of the present invention, a third power output apparatus for outputting power to a drive shaft comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the drive shaft, the stator being electromagnetically coupled with the third rotor; second motor-driving means for exchanging electric currents with the second motor to vary the electromagnetic coupling of the stator with the third rotor; storage means for storing electric power; and control means for controlling the first motor-driving means to electromagnetically lock up the first rotor relative to the second rotor of the first motor and thereby allow the output shaft of the engine to rotate with the drive shaft in a substantially integral manner, and controlling the second motor-driving means to supply the electric power stored in the storage means to the second motor in order to activate the second motor and thereby make the second motor apply a torque to the drive shaft.

In the third power output apparatus of the present invention, the control means controls the first motor-driving means to electromagnetically lock up the first rotor relative to the second rotor of the first motor and thereby allow the output shaft of the engine to rotate with the drive shaft in a substantially integral manner. The control means concurrently controls the second motor-driving means to activate the second motor with the electric power stored in the storage means and enable the second motor to apply a torque to the drive shaft. Since the output shaft of the engine is substantially integral with the drive shaft, the torque produced by the second motor enables the engine to exert an effect of engine brake. The output shaft of the engine accordingly receives a friction torque produced by the engine. The friction torque is substantially equal in magnitude but opposite in direction to the torque of the second motor, so that the friction torque and the torque of the second motor cancel each other on the stationary axis consisting of the output shaft of the engine and the drive shaft.

The structure of the third power output apparatus can make the output torque of the drive shaft approximately equal to zero. The second motor is driven with the electric power stored in the storage means. This structure consumes the electric power in the storage means and is thus suitable for the cases that the storage means has an excess residual capacity of electric power.

According to still another aspect of the present invention, an fourth power output apparatus for outputting power to a drive shaft comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the output shaft of the engine, the stator being electromagnetically coupled with the third rotor; second motor-driving means for exchanging electric currents with the second motor to vary the electromagnetic coupling of the stator with the third rotor; and control means for controlling the first motor-driving means to substantially disconnect the electromagnetic coupling of the first rotor with the second rotor in the first motor, and controlling the second motor-driving means to enable the second motor to regenerate electric power.

In the fourth power output apparatus of the present invention, the control means controls the first motor-driving means to substantially disconnect the electromagnetic coupling of the first rotor with the second rotor in the first motor. The control means concurrently controls the second motor-driving means to enable the second motor to regenerate electric power via the second motor-driving means. The substantial disconnection of the electromagnetic coupling of the first rotor with the second rotor makes the drive shaft separated and free from the output shaft of the engine, so that no torque is applied to the drive shaft by the first motor.

The structure of the fourth power output apparatus can make the output torque of the drive shaft approximately equal to zero while enabling the second motor to regenerate electric power. This structure is especially suitable for the cases requiring additional electric power.

According to still another aspect of the present invention, a fifth power output apparatus for outputting power to a drive shaft comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the output shaft of the engine, the stator being electromagnetically coupled with the third rotor; second motor-driving means for exchanging electric currents with the second motor to vary the electromagnetic coupling of the stator with the third rotor; storage means for storing electric power; and control means for controlling the first motor-driving means to substantially disconnect the electromagnetic coupling of the first rotor with the second rotor in the first motor, and controlling the second motor-driving means to supply the electric power stored in the storage means to the second motor in order to activate the second motor.

In the fifth power output apparatus of the present invention, the control means controls the first motor-driving means to substantially disconnect the electromagnetic coupling of the first rotor with the second rotor in the first motor. The control means concurrently controls the second motor-driving means to activate the second motor with the electric power stored in the storage means. The substantial disconnection of the electromagnetic coupling of the first rotor with the second rotor makes the drive shaft separated and free from the output shaft of the engine, so that no torque is applied to the drive shaft by the first motor.

The structure of the fifth power output apparatus can make the output torque of the drive shaft approximately equal to zero. The second motor is driven with the electric power stored in the storage means. This structure consumes the electric power in the storage means and is thus suitable for the cases that the storage means has an excess residual capacity of electric power.

According to still another aspect of the present invention, a sixth power output apparatus mounted on a transportation system for outputting power to a drive shaft in order to drive the transportation system, which comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; a second motor comprising a stator and a third rotor connecting with either one of the drive shaft and the output shaft of the engine; driving condition detecting means for detecting a driving condition of the transportation system; and control means for, when the driving condition detected by the driving condition detecting means represents a predetermined state, controlling the engine, the first motor, and the second motor to make a torque output to the drive shaft approximately equal to zero.

This enables the current driving condition to be maintained.

According to still another aspect of the present invention, a seventh power output apparatus for outputting power to a drive shaft comprises: an engine connected with a rotating shaft; a first motor connected with the drive shaft shaft; and a second motor connected with the rotating shaft; wherein the engine produces mechanical energy and transmits the mechanical energy to the rotating shaft; the first motor converts part of the mechanical energy transmitted via the rotating shaft to electrical energy while transmits the residual mechanical energy to the second motor; and the second motor converts the mechanical energy transmitted from the first motor to electrical energy without transmitting any mechanical energy to the drive shaft.

This structure, which converts the mechanical energy output from the engine to electrical energy with the first motor and the second motor, is especially suitable for the cases requiring a large mass of electrical energy.

According to still another aspect of the present invention, a eighth power output apparatus for outputting mechanical energy as power to a drive shaft comprises: an engine connected with a rotating shaft; a first motor connected with the rotating shaft; a second motor connected with the drive shaft; and storage means for storing electrical energy; wherein the first motor converts the electrical energy supplied from the storage means to mechanical energy and transmits the sum of the mechanical energy converted from the electrical energy and mechanical energy transmitted from a second motor to the rotating shaft; the second motor converts the electrical energy supplied from the storage means to mechanical energy and transmits the mechanical energy to the first motor without transmitting any mechanical energy to the drive shaft; and the engine converts the mechanical energy transmitted via the rotating shaft to another form of energy.

The structure of the eighth power output apparatus does not transmit any mechanical energy to the drive shaft, thereby enabling the output torque of the drive shaft to be approximately equal to zero. The electrical energy stored in the storage means is converted to mechanical energy and then to heat or another form of energy. This decreases the electrical energy stored in the storage means. This structure is especially suitable for the cases that the storage means has excess electrical energy.

According to still another aspect of the present invention, a ninth power output apparatus for outputting mechanical energy as power to a drive shaft comprises: an engine connected with a rotating shaft; a first motor connected with the rotating shaft; and a second motor connected with the drive shaft; wherein the engine produces mechanical energy and transmits the mechanical energy to the rotating shaft; the first motor converts electrical energy supplied from the second motor to mechanical energy and transmits the sum of the mechanical energy converted from the electrical energy and the mechanical energy transmitted via the rotating shaft to the second motor; and the second motor converts the mechanical energy transmitted from the first motor to electrical energy without transmitting any mechanical energy to the drive shaft, and supplies part of the electrical energy converted from the mechanical energy to the first motor.

The structure of the ninth power output apparatus does not transmit any mechanical energy to the drive shaft, thereby enabling the output torque of the drive shaft to be approximately equal to zero. Part of the electrical energy obtained by the second motor is supplied to the first motor and converted to mechanical energy. The residual electrical energy may be used for another purpose according to the requirements.

According to still another aspect of the present invention, a tenth power output apparatus for outputting mechanical energy as power to a drive shaft comprises: an engine connected with a rotating shaft; a first motor connected with the rotating shaft; a second motor connected with the drive shaft; and storage means for storing electrical energy; wherein the first motor converts part of mechanical energy transmitted from the second motor to electrical energy, supplies the electrical energy to the second motor, and transmits the residual mechanical energy to the rotating shaft; the second motor converts the electrical energy supplied from the first motor and the electrical energy supplied from the storage means to mechanical energy, and transmits the mechanical energy to the first motor without transmitting any mechanical energy to the drive shaft; and the engine for converts the mechanical energy transmitted via the rotating shaft to another form of energy.

The structure of the tenth power output apparatus does not transmit any mechanical energy to the drive shaft, thereby enabling the output torque of the drive shaft to be approximately equal to zero. The electrical energy stored in the storage means is converted to mechanical energy and then to heat or another form of energy. This decreases the electrical energy stored in the storage means. This structure is especially suitable for the cases that the storage means has excess electrical energy.

The above objects are also realized by a method of controlling a power output apparatus for outputting power to a drive shaft.

The method comprises the steps of: (a) providing an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors, the first motor applying a first torque to the drive shaft; and a second motor comprising a stator and a third rotor connected with the drive shaft, the stator being electromagnetically coupled with the third rotor, the second motor applying a second torque to the drive shaft; (b) adjusting the first and second torques, so that the second torque is substantially equal in magnitude in opposite direction to the first torque.

In the method of the present invention, the first motor-driving means is controlled to enable the first motor to apply a first torque to the drive shaft, whereas the second motor-driving means is controlled to enable the second motor to apply a second torque to the drive shaft. The second torque is substantially equal in magnitude in opposite direction to the first torque, so that the first torque and the second torque cancel each other on the drive shaft.

The method can make the output torque of the drive shaft approximately equal to zero.

In accordance with one aspect of the present invention, the step (a) comprises the step of providing storage means for storing electric power; and the step (b) comprises the steps of: (b-1) enabling the first motor to regenerate electric power; (b-2) enabling the second motor to regenerate electric power; and (b-3) storing at least part of the regenerated electric power into the storage means.

The method can make the output torque of the drive shaft approximately equal to zero while enabling the first motor and the second motor to regenerate electric power. This structure is especially suitable for the cases requiring strong electric power. The method allows at least part of the regenerated electric power to be supplied to the storage means and thereby supplement the electric power of the storage means. This does not waste the regenerated electric power but allows efficient application of the electric power according to the requirements.

In accordance with another aspect of the present invention, the step (a) comprises the step of providing storage means for storing electric power; and the step (b) comprises the steps of: (b-1) supplying the electric power stored in the storage means to the first motor in order to activate the first motor; and (b-2) supplying the electric power stored in the storage means to the second motor in order to activate the second motor.

The method can make the output torque of the drive shaft approximately equal to zero while driving the first motor and the second motor with the electric power stored in the storage means. This structure consumes the electric power in the storage means and is thus suitable for the cases that the storage means has an excess residual capacity of electric power.

In accordance with still another aspect of the present invention, the step (a) comprises the step of providing storage means for storing electric power; and the step (b) comprises the steps of: (b-1) enabling the second motor to regenerate electric power; (b-2) supplying the regenerated electric power to the first motor in order to activate the first motor; and (b-3) storing at least part of the regenerated electric power into the storage means.

The method can make the output torque of the drive shaft approximately equal to zero. The method allows at least part of the electric power regenerated by the second motor to be supplied to the storage means and thereby supplement the electric power of the storage means. This allows efficient application of the electric power according to the requirements.

In accordance with still another aspect of the present invention, the step (a) comprises the step of providing storage means for storing electric power; and the step (b) comprises the steps of: (b-1) enabling the first motor to regenerate electric power; and (b-2) supplying the regenerated electric power and the electric power stored in the storage means to the second motor in order to activate the second motor The method can make the output torque of the drive shaft approximately equal to zero. The second motor is driven with the electric power stored in the storage means as well as the regenerated electric power. This structure consumes the electric power in the storage means and is thus suitable for the cases that the storage means has an excess residual capacity of electric power.

These and other objects, features, aspects, and advantages of the present invention will become more apparent from the following detailed description of the preferred embodiments with the accompanying drawings.

BRIEF DESCRIPTION OF THE DRAWINGS

FIG. 24 tabulates the first through the seventh arrangements of operation in the first through the third embodiments;

DETAILED DESCRIPTION OF PREFERRED EMBODIMENTS

Figure 1:
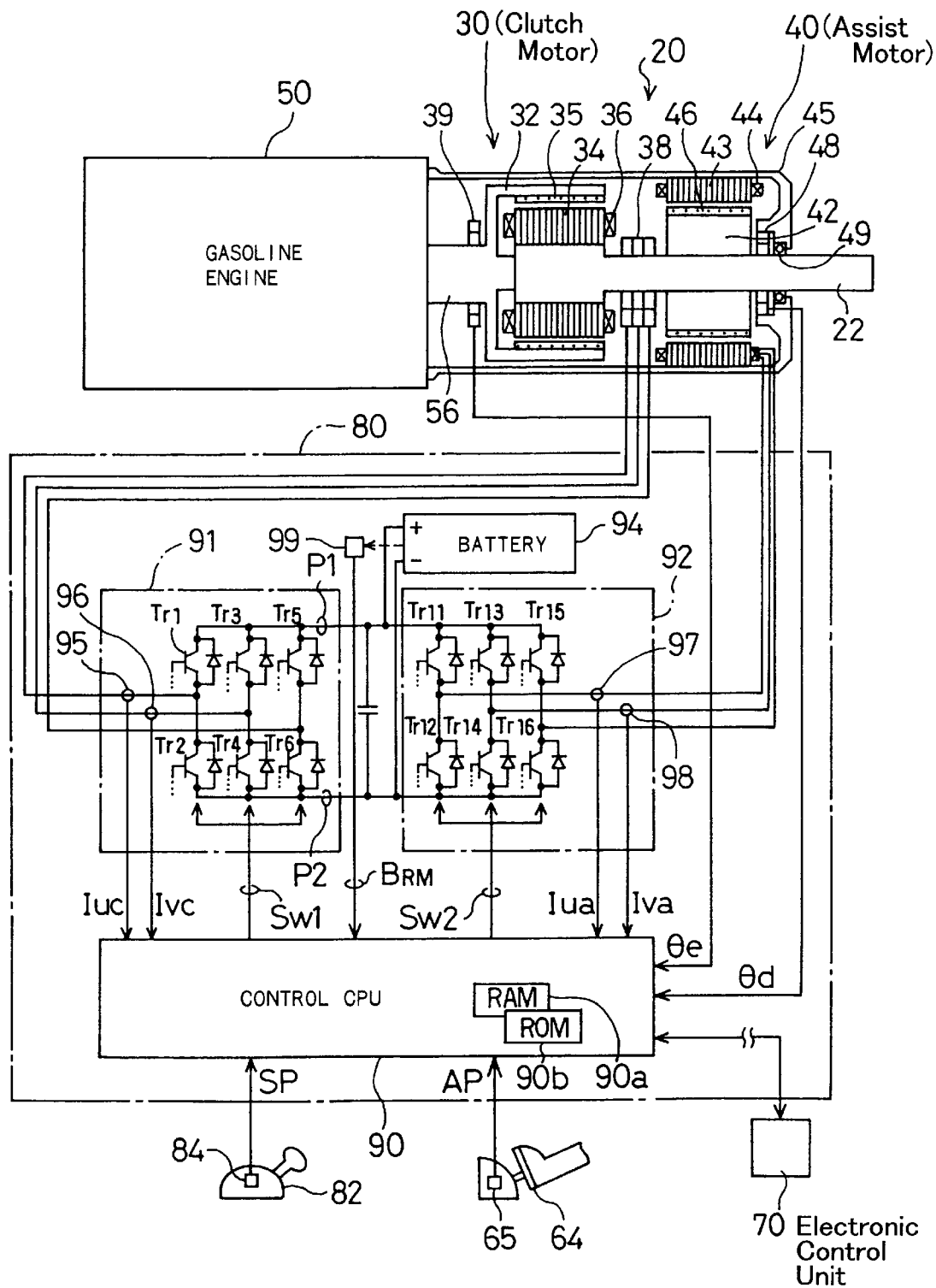
FIG. 1 schematically illustrates structure of a power output apparatus 20 as a first embodiment according to the present invention.
Figure 2:
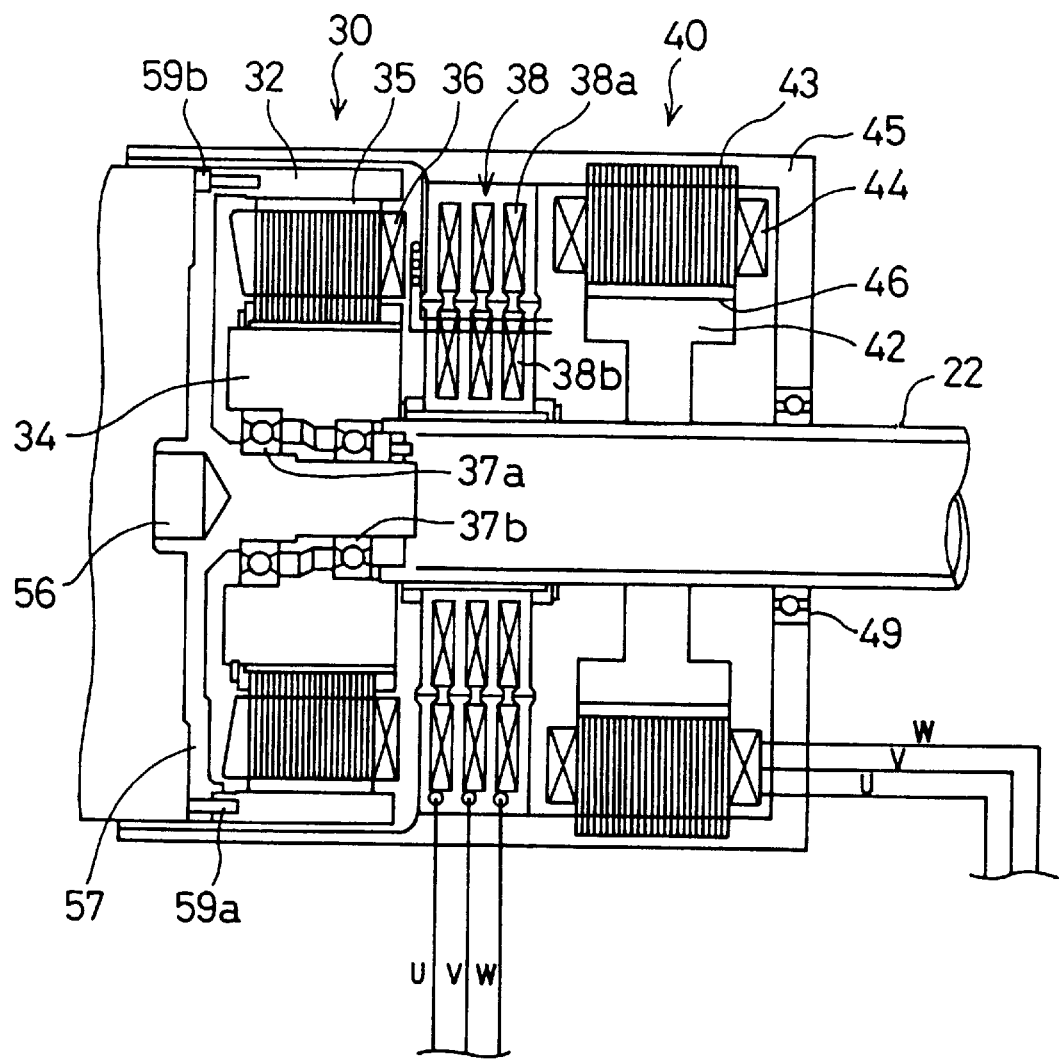
FIG. 2 is a cross sectional view illustrating detailed structures of a clutch motor 30 and an assist motor 40 included in the power output apparatus 20 of FIG. 1.
Figure 3:
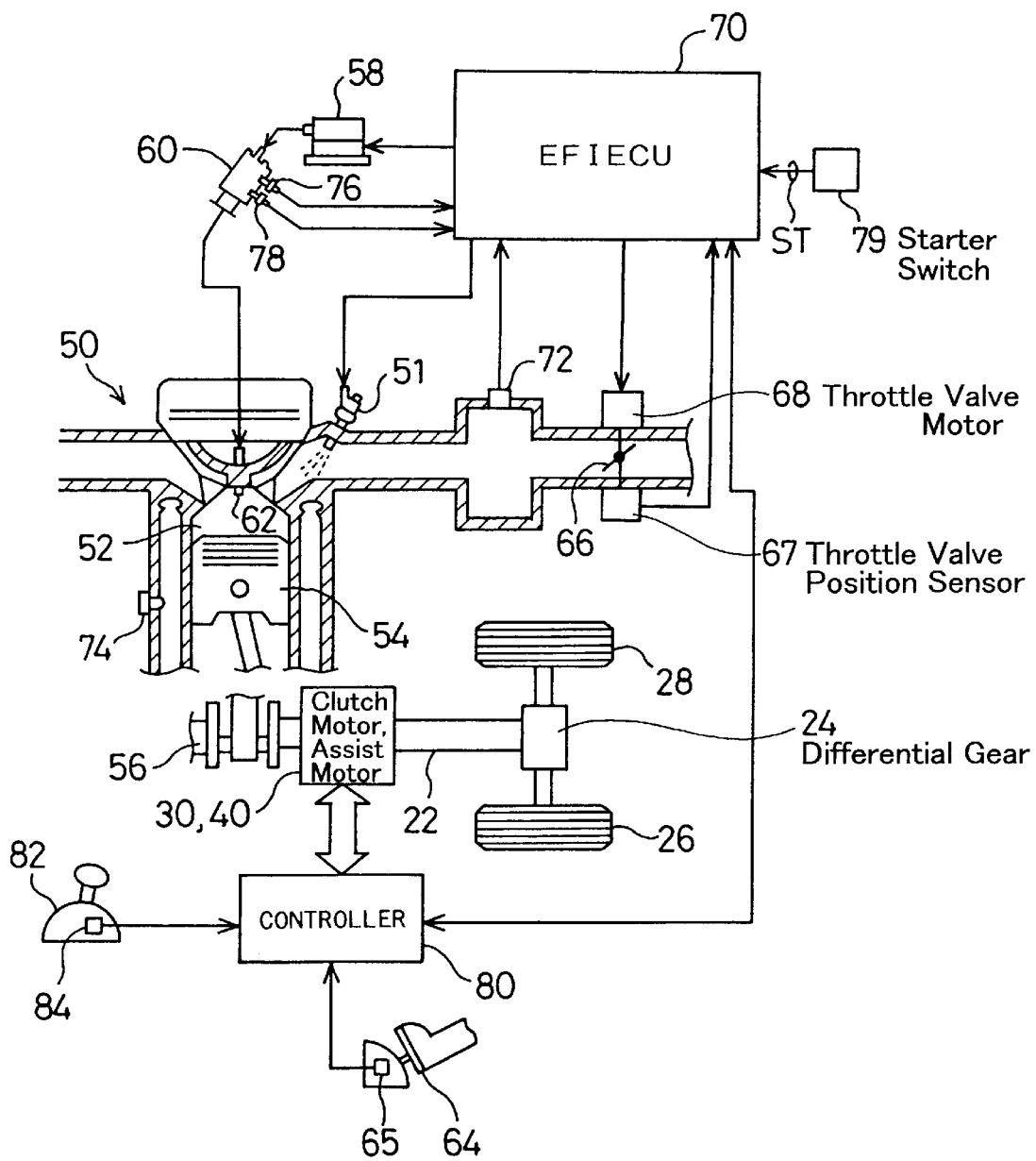
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle has a gasoline engine 50 driven by gasoline as a power source or a prime mover. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by a motor 68. An ignition plug 62 converts a high voltage applied from an igniter 58 via a distributor 60 to a spark, which explosively ignites and combusts the air/fuel mixture.

Operation of the gasoline engine 50 is controlled by an electronic control unit (hereinafter referred to as EFIECU) 70. The EFIECU 70 receives information from various sensors, which detect operating conditions of the gasoline engine 50. These sensors include a throttle position sensor 67 for detecting the valve travel or the position of the throttle valve 66, a manifold vacuum sensor 72 for measuring a load applied to the gasoline engine 50, a water temperature sensor 74 for measuring the temperature of cooling water in the gasoline engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the gasoline engine 50 is linked with a drive shaft 22 via a clutch motor 30 and an assist motor 40. The drive shaft 22 further connects with a differential gear 24, which eventually transmits the torque output from the drive shaft 22 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the gasoline engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the gasoline engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the gasoline engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the gasoline engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The following describes the essential operation of the power output apparatus 20 in a normal driving state of the vehicle, when the drive shaft 22 is rotated at a lower revolving speed than that of the crankshaft 56 of the gasoline engine 50. By way of example, it is assumed that the gasoline engine 50 driven by the EFIECU 70 rotates at a predetermined revolving speed Ne and that the drive shaft 22 rotates in the direction of rotation of the crankshaft 56 at a revolving speed Nd lower than the predetermined revolving speed Ne (Nd<Ne).

The control CPU 90 of the controller 80 refers to the output data of the residual capacity meter 99 and determines whether the residual capacity BRM of the battery 94 is out of an allowable range (that is, either smaller than an allowable minimum value Bmin or greater than an allowable maximum value Bmax) or within the allowable range (that is, not less than the allowable minimum value Bmin and not greater than the allowable maximum value Bmax). When the residual capacity BRM of the battery 94 is determined to be out of the allowable range, the control CPU 90 outputs the first control signal SW1 to control on and off the transistors Tr1 through Tr6 in the first driving circuit 91 concurrently with outputting the second control signal SW2 to control on the off the transistors Tr11 through Tr16 in the second driving circuit 92. This operation enables an electric current to flow through the three-phase coils 36 in the clutch motor 30 and thereby electromagnetically connect the outer rotor 32 with the inner rotor 34. An electric current is also made to flow through the three-phase coils 44 in the assist motor 40, so that the rotor 42 is electromagnetically connected with the stator 43. The clutch motor 30 and the assist motor 40 may work as a normal motor to carry out the power operation or alternatively work as a generator to carry out the regenerative operation.

When the residual capacity BRM of the battery 94 is smaller than the allowable minimum value Bmin and thus determined to be out of the allowable range, both the clutch motor 30 and the assist motor 40 are controlled to carry out the regenerative operation. This corresponds to a first arrangement of operation, in which the clutch motor 30 regenerates electric power via the first driving circuit 91 whilst the assist motor 40 regenerates electric power via the second driving circuit 92. The electric power thus generated by the clutch motor 30 and the assist motor 40 is supplied to and stored in the battery 94.

Figure 4:
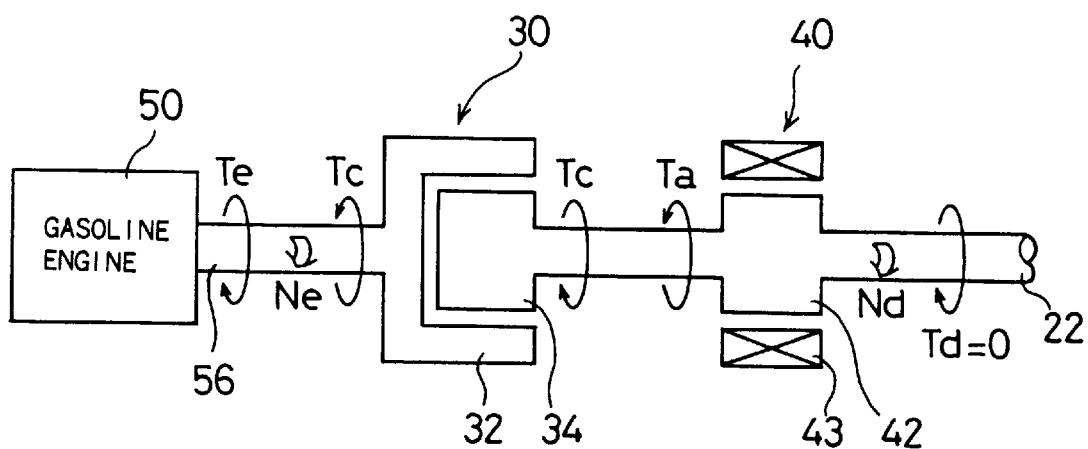
FIG. 4 shows torques applied to the drive shaft 22 and the crankshaft 56 of the power output apparatus 20 of FIG. 1 in a first arrangement of operation.

FIG. 4 shows torques applied to the drive shaft 22 and the crankshaft 56 of the power output apparatus 20 of FIG. 1 in the first arrangement of operation. By way of example, it is assumed that the crankshaft 56 of the gasoline engine 50 is rotated at a predetermined revolving speed Ne in the direction defined by the open arrow of FIG. 4, while the drive shaft 22 is rotated in the same direction defined by the open arrow at a revolving speed Nd, which is lower than the revolving speed Ne (Nd<Ne). As mentioned previously, both the clutch motor 30 and the assist motor 40 are controlled to implement the regenerative operation in the first arrangement of operation. The crankshaft 56 receives a torque Te produced by the gasoline engine 50 in the direction of rotation of the crankshaft 56 as well as a torque Tc produced by the clutch motor 30 in the reverse of the rotation of the crankshaft 56. In a stationary state where the revolving speed Ne of the crankshaft 56 is practically kept constant, the torque Te substantially balances with the torque Tc. This means that the magnitude of the torque Te is substantially equal to that of the torque Tc. The drive shaft 22, on the other hand, receives a torque Tc produced by the clutch motor 30 in the direction of rotation of the drive shaft 22 as well as a torque Ta produced by the assist motor 40 in the reverse of the rotation of the drive shaft 22. The torque Tc applied to the drive shaft 22 by the clutch motor 30 is opposite in direction to the torque Ta applied to the drive shaft 22 by the assist motor 40. Provided that the magnitude of the torque Tc is identical with that of the torque Ta, the torques Tc and Ta cancel each other on the drive shaft 22. The output torque Td of the drive shaft 22 thus becomes substantially equal to zero. In the first arrangement of operation shown in FIG. 4, the torque Tc of the clutch motor 30 applied to the drive shaft 22 is a reaction of the torque Tc applied to the crankshaft 56.

When the residual capacity BRM of the battery 94 is greater than the allowable maximum value Bmax and thus determined to be out of the allowable range, both the clutch motor 30 and the assist motor 40 are controlled to carry out the power operation with electric power supplied from the battery 94. This corresponds to a second arrangement of operation, in which both the clutch motor 30 and the assist motor 40 consume the electric power stored in the battery 94.

Figure 5:
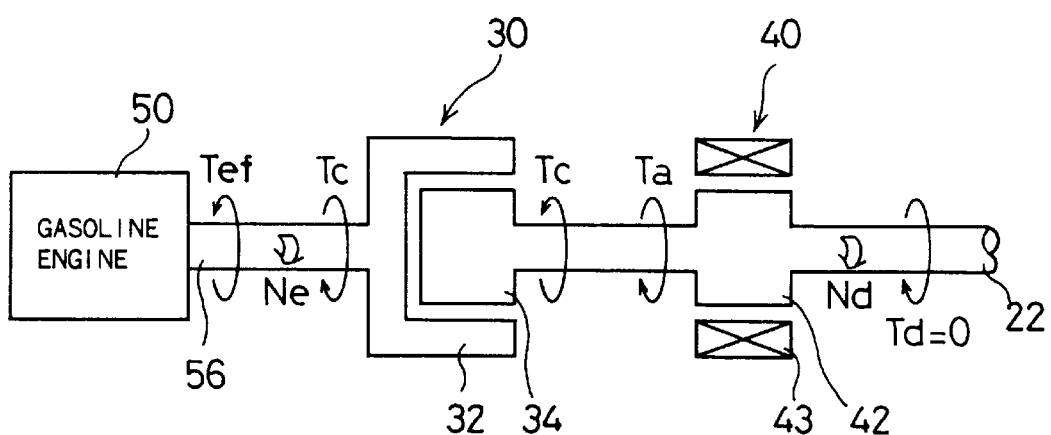
FIG. 5 shows torques applied to the drive shaft 22 and the crankshaft 56 of the power output apparatus 20 of FIG. 1 in a second arrangement of operation.

FIG. 5 shows torques applied to the drive shaft 22 and the crankshaft 56 of the power output apparatus 20 of FIG. 1 in the second arrangement of operation. As mentioned previously, both the clutch motor 30 and the assist motor 40 are controlled to implement the power operation in the second arrangement of operation. The crankshaft 56 receives a torque Tc produced by the clutch motor 30 in the direction of rotation of the crankshaft 56. Since the torque Tc acts to enhance the rotation of the crankshaft 56, the gasoline engine 50 exerts an effect of engine brake. The crankshaft 56 accordingly receives a friction torque Tef produced by the gasoline engine 50, which is equal in magnitude but opposite in direction to the torque Tc. The drive shaft 22, on the other hand, receives a torque Tc produced by the clutch motor 30 in the reverse of the rotation of the drive shaft 22 as well as a torque Ta produced by the assist motor 40 in the direction of rotation of the drive shaft 22. The torque Tc applied to the drive shaft 22 by the clutch motor 30 is opposite in direction to the torque Ta applied to the drive shaft 22 by the assist motor 40. Provided that the magnitude of the torque Tc is identical with that of the torque Ta, the torques Tc and Ta cancel each other on the drive shaft 22. The output torque Td of the drive shaft 22 thus becomes substantially equal to zero. Like the first arrangement of operation shown in FIG. 4, the torque Tc of the clutch motor 30 applied to the drive shaft 22 is a reaction of the torque Tc applied to the crankshaft 56 in the second arrangement of operation shown in FIG. 5.

When the residual capacity BRM of the battery 94 is determined to be within the allowable range, the control CPU 90 controls the first driving circuit 91 and the second driving circuit 92 to prevent electric currents from flowing through the three-phase coils 36 of the clutch motor 30 and the three-phase coils 44 of the assist motor 40, respectively. This corresponds to a third arrangement of operation, in which the control CPU 90 disconnects the electromagnetic coupling of the outer rotor 32 with the inner rotor 34 in the clutch motor 30 as well as the electromagnetic coupling of the rotor 42 with the stator 43 in the assist motor 40. Under such conditions, no torques are applied to the drive shaft 22 by either the clutch motor 30 or the assist motor 40. The output torque Td of the drive shaft 22 thus becomes substantially equal to zero.

It is, however, not required to completely cut off the electromagnetic coupling of the outer rotor 32 with the inner rotor 34 or the same of the rotor 42 with the stator 43, as long as practical disconnection is attained. In this state, weak electric currents may flow through the three-phase coils 36 of the clutch motor 30 and the three-phase coils 44 of the assist motor 40 to maintain the weak coupling, as long as substantially no torques are applied to the drive shaft 22 by either the clutch motor 30 or the assist motor 40.

The vehicle falls in a free running state when the output torque of the drive shaft 22 is made substantially equal to zero as discussed above.

Figure 6:
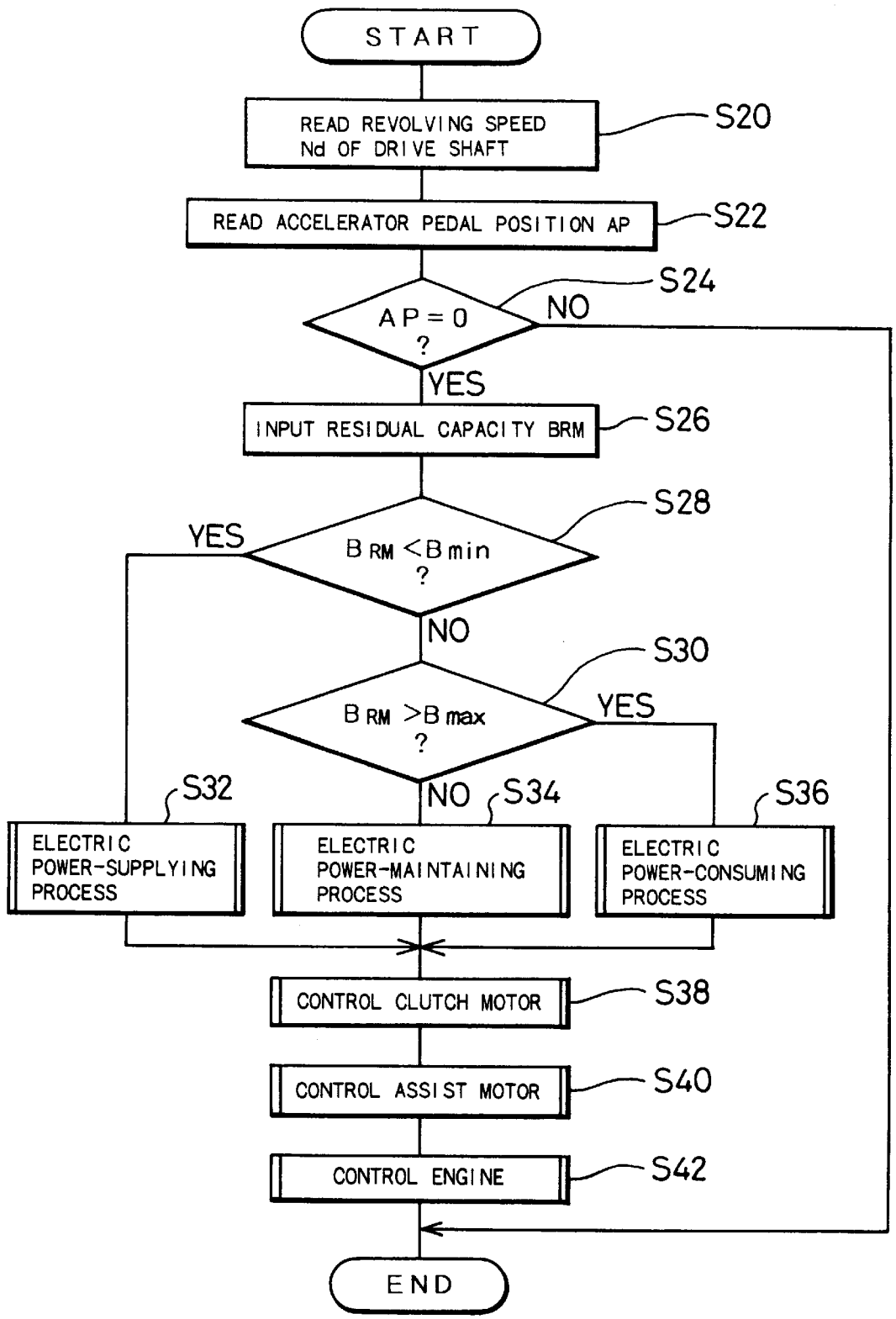
FIG. 6 is a flowchart showing a control routine executed by the control CPU 90 of the power output apparatus 20 to enable the vehicle to fall in a free running state under a normal driving condition.

The following gives detailed description of the control procedure executed by the controller 80 to enable free running of the vehicle when the vehicle is in a normal driving state (that is, when the revolving speed of the drive shaft 22 is lower than that of the crankshaft 56 of the gasoline engine 50). FIG. 6 is a flowchart showing a control routine executed by the control CPU 90 of the controller 80 to enable the vehicle to fall in a free running state under the normal driving condition. When the program enters the routine, the control CPU 90 first receives data of revolving speed Nd of the drive shaft 22 at step S20. The revolving speed Nd of the drive shaft 22 can be computed from the rotational angle θd of the drive shaft 22 read from the resolver 48.

At subsequent step S22, the control CPU 90 reads the accelerator pedal position AP output from the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. It is then determined at step S24 whether the input accelerator pedal position AP is equal to zero. The accelerator pedal position AP=0 (that is, the step-on amount of the accelerator pedal 64 equal to zero) represents the case in which the driver does not step on the accelerator pedal 64 but desires the vehicle to maintain the current driving condition. In other words, the driver does not need the output torque of the drive shaft 22 but requires free running of the vehicle. When the accelerator pedal position AP is equal to zero, the program proceeds to step S26 for the free running control. When the accelerator pedal position AP is not equal to zero, on the other hand, the program determines that the driver does not require any free running of the vehicle and directly exits from this routine.

At step S26, the control CPU 90 reads the residual capacity BRM of the battery 94 from the residual capacity meter 99. The input residual capacity BRM is compared with an allowable minimum value Bmin at step S28 and subsequently with an allowable maximum value Bmax at step S30. The residual capacity BRM of the battery 94 has an allowable range. The life of the battery 94 may undesirably be shortened when the residual capacity BRM is kept out of the allowable range. In this embodiment, the allowable minimum value Bmin and the allowable maximum value Bmax are previously set as the minimum value and the maximum value of the allowable range. When the residual capacity BRM is less than the allowable minimum value Bmin, the first arrangement of operation is selected to enable both the clutch motor 30 and the assist motor 40 to carry out the regenerative operation and supply the regenerated electric power to the battery 94. When the residual capacity BRM is greater than the allowable maximum value Bmax, on the contrary, the second arrangement of operation is selected to enable both the clutch motor 30 and the assist motor 40 to carry out the power operation and consume the electric power stored in the battery 94. The residual capacity BRM of the battery 94 accordingly comes into the allowable range through either the first arrangement of operation or the second arrangement of operation.

When the residual capacity BRM of the battery 94 is determined to be less than the allowable minimum value Bmin at step S28, the program goes to step S32 to execute an electric power-supplying process in order to realize the first arrangement of operation, in which both the clutch motor 30 and the assist motor 40 are controlled to implement the regenerative operation and charge the battery 94 with the regenerated electric power. When the residual capacity BRM of the battery 94 is determined to be greater than the allowable maximum value Bmax at step S30, on the other hand, the program goes to step S36 to execute an electric power-consuming process in order to realize the second arrangement of operation, in which both the clutch motor 30 and the assist motor 40 are controlled to implement the power operation and consume the electric power stored in the battery 94. When the residual capacity BRM of the battery 94 is determined to be within the allowable range at steps S28 and S30 (that is, when the residual capacity BRM is not less than the allowable minimum value Bmin and not greater than the allowable maximum value Bmax), the program goes to step S34 to execute an electric power-maintaining process in order to realize the third arrangement of operation, in which both the clutch motor 30 and the assist motor 40 are controlled to stop working and the battery 94 is kept in the current state.

Figure 7:
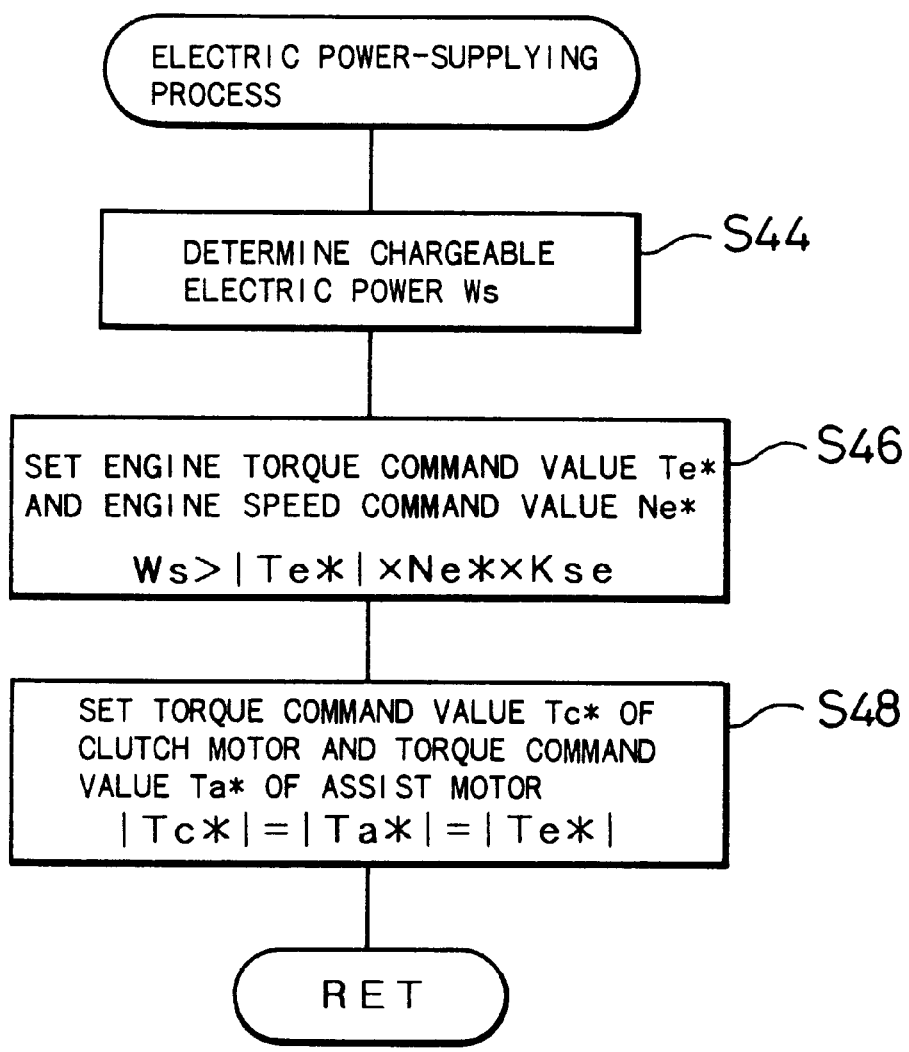
FIG. 7 is a flowchart showing details of an electric power-supplying process executed at step S32 in the flowchart of FIG. 6.

FIG. 7 is a flowchart showing details of the electric power-supplying process executed at step S32 in the flowchart of FIG. 6. When the program enters the routine of electric power-supplying process, the control CPU 90 of the controller 80 first determines chargeable electric power Ws with which the battery 94 can be charged at step S44. The battery 94 can not be charged with the electric power exceeding this chargeable electric power Ws. The chargeable electric power Ws depends upon the residual capacity BRM of the battery 94. The chargeable electric power Ws is thus calculated from the residual capacity BRM of the battery 94 measured by the residual capacity meter 99.

At subsequent step S46, the control CPU 90 sets a target engine torque Te* and a target engine speed Ne* (that is, target revolving speed of the crankshaft 56) of the gasoline engine 50. The target engine torque Te* and the target engine speed Ne* may hereinafter be referred to as the engine torque command value Te* and the engine speed command value Ne*. The engine torque command value Te* and the engine speed command value Ne* are determined to satisfy the relationship expressed as:

$$Ws > |Te^*| \times Ne^* \times Kse$$

wherein Ws represents the chargeable electric power computed at step S44, |Te*|×Ne* represents energy output from the gasoline engine 50, and Kse denotes an efficiency of conversion for converting the output energy of the gasoline engine 50 to electric power. The right side of the above expression accordingly represents the electric power obtained through the conversion of the output energy of the gasoline engine 50. At step S46, the control CPU 90 sets the engine torque command value Te* and the engine speed command value Ne* to make the electric power obtained through the conversion less than the chargeable electric power Ws which the battery 94 can be charged with. There are, however, numerous combinations of the engine torque Te and the engine speed Ne satisfying the above relationship. In this embodiment, an optimal combination of the engine torque Te and the engine speed Ne to realize operation of the gasoline engine 50 at the possible highest efficiency is selected as the engine torque command value Te* and the engine speed command value Ne*.

The control CPU 90 then sets a torque command value Tc* of the clutch motor 30 and a torque command value Ta* of the assist motor 40 at step S48. In the first arrangement of operation shown in FIG. 4 when both the clutch motor 30 and the assist motor 40 are controlled to carry out the regenerative operation, in order to keep the revolving speed Ne of the gasoline engine 50 (engine speed) practically constant in a stationary state, it is required to make the torque Tc of the clutch motor 30 substantially equal in magnitude to and balance with the torque Te of the gasoline engine 50 (engine torque). In order to set the output torque Td of the drive shaft 22 practically equal to zero, it is required to make the torque TC of the clutch motor 30 and the torque Ta of the assist motor 40 substantially equal in magnitude to each other and cancel each other on the drive shaft 22. At step S48, the torque command value Tc* of the clutch motor 30, the torque command value Ta* of the assist motor 40, and the engine torque command value Te* are accordingly set equal to one another as given below:

$$|Tc^*| = |Ta^*| = |Te^*|$$

After concluding the processing of step S48, the program exits from the routine of electric power-supplying process of FIG. 7 and returns to the control routine shown in the flowchart of FIG. 6. The control CPU 90 carries out the control procedures to control the clutch motor 30 at step S38, the assist motor 40 at step S40, and the gasoline engine 50 at step S42. As a matter of convenience of illustration, the control operations of the clutch motor 30, the assist motor 40, and the gasoline engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to enable the EFIECU 70 to control the gasoline engine 50 concurrently.

Figure 8:
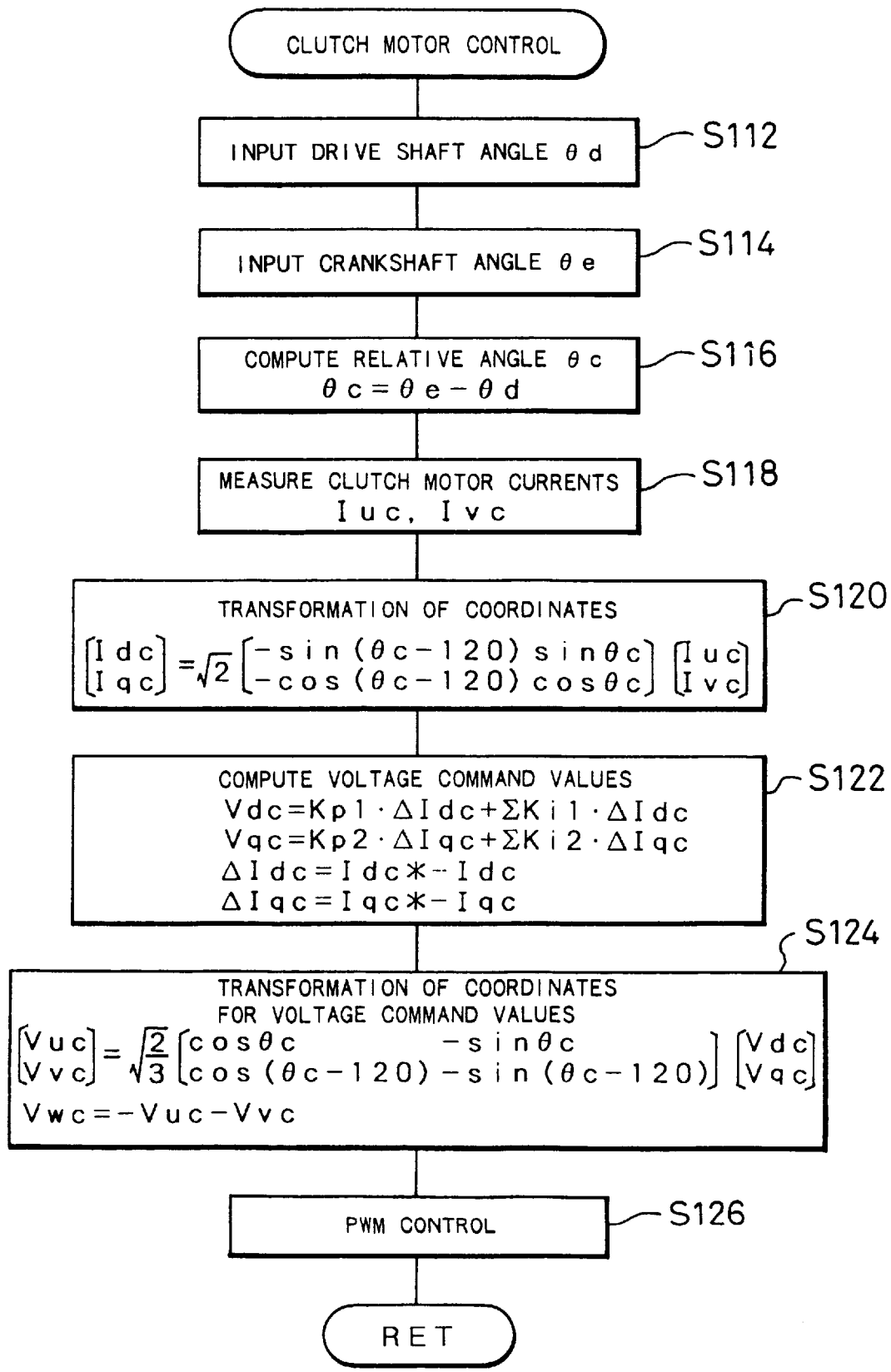
FIG. 8 is a flowchart showing details of a control process of the clutch motor 30 executed at step S38 in the flowchart of FIG. 6.

FIG. 8 is a flowchart showing details of the control process of the clutch motor 30 executed at step S38 in the flowchart of FIG. 6. When the program enters the clutch motor control routine, the control CPU 90 of the controller 80 first reads the rotational angle θd of the drive shaft 22 from the resolver 48 at step S112 and the rotational angle θe of the crankshaft 56 of the gasoline engine 50 from the resolver 39 at step S114. The control CPU 90 then computes a relative angle θc of the drive shaft 22 and the crankshaft 56 by the equation θc=θe−θd at step S116.

The program proceeds to step S118, at which the control CPU 90 receives data of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPu 90 executes operations following Equations (2) and Equations (3) given below:

$$\Delta Idc = Idc^* - Idc$$
$$\Delta Iqc = Iqc^* - Iqc \quad (2)$$
$$Vdc = Kp1 \cdot \Delta Idc + \Sigma Ki1 \cdot \Delta Idc$$
$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (vqc) includes a part in proportion to the deviation ΔI from the current command value I* (first term in right side of Equation (3)) and a summation of historical data of the deviations ΔI for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix}$$

$$Vwc = -Vuc - Vvc \qquad (4)$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values Vuc, Vvc, and Vwc determined by Equation (4) above. This process enables the clutch motor 30 to mechanically transmit the target torque to the drive shaft 22.

Figure 9:
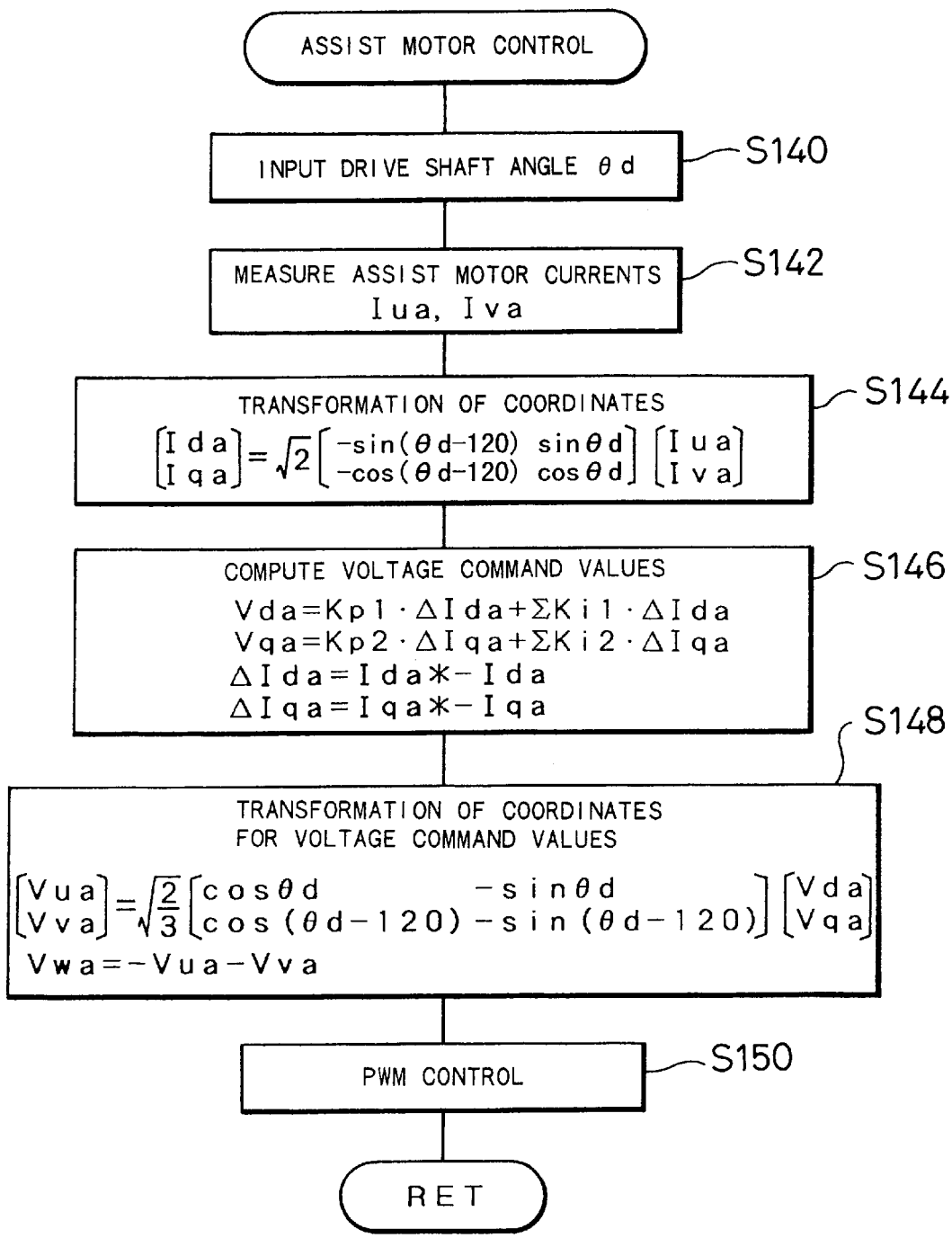
FIG. 9 is a flowchart showing details of a control process of the assist motor 40 executed at step S40 in the flowchart of FIG. 6.

FIG. 9 is a flowchart showing details of the control process of the assist motor 40 executed at step S40 in the flowchart of FIG. 6. When the program enters the assist motor control routine, the control CPU 90 first reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. The control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 8.

The control of the gasoline engine 50 (step S42 in the flowchart of FIG. 6) is executed in the following manner. The target engine torque Te* and the target engine speed Ne* have already been set at step S46 in the flowchart of FIG. 7. The control CPU 90 then regulates the torque Te and the revolving speed Ne of the gasoline engine 50 to make them approach the target engine torque Te* and the target engine speed Ne*, respectively. In accordance with a concrete procedure, the control CPU 90 sends an instruction to the EFIECU 70 through communication to enable the EFIECU 70 to regulate the amount of fuel injection or the throttle valve position. Such regulation makes the torque Te and the revolving speed Ne of the gasoline engine 50 eventually approach the target engine torque Te* and the target engine speed Ne*.

In the first arrangement of operation, both the clutch motor 30 and the assist motor 40 are controlled to implement the regenerative operation and supply the regenerated electric power to the battery 94 in order to supplement the electric power of the battery 94. The regenerative operation of the clutch motor 30 and the assist motor 40 causes the torque Tc of the clutch motor 30 to act on the drive shaft 22 opposite in direction to the torque Ta of the assist motor 40. Since the torque Tc and the torque Ta are equal to each other in magnitude, the torque Tc and the torque Ta cancel each other on the drive shaft 22. This makes the output torque Td of the drive shaft 22 substantially equal to zero, thereby realizing a free running state of the vehicle.

Figure 10:
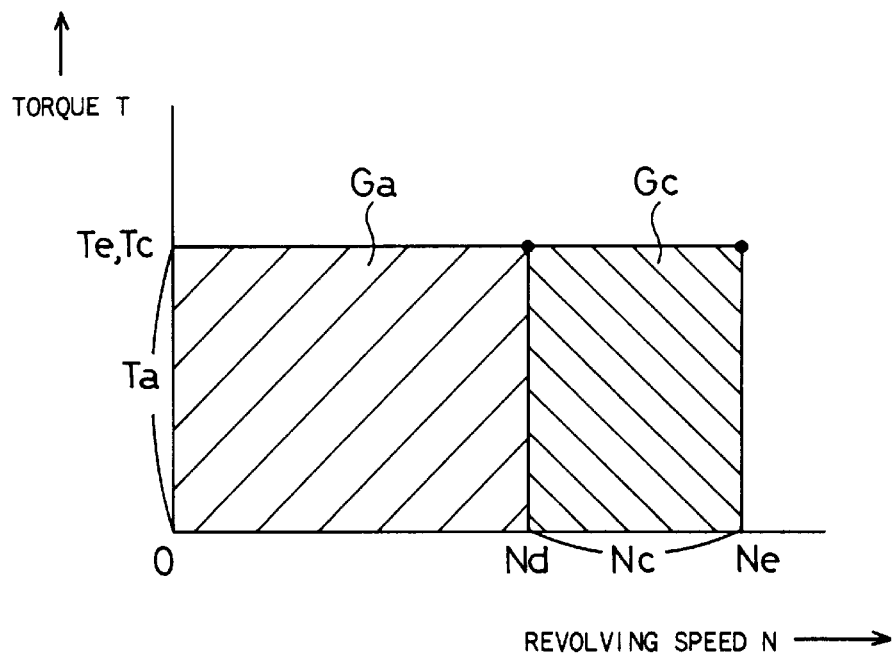
FIG. 10 is a graph schematically illustrating an amount of energy regenerated by the clutch motor 30 and that regenerated by the assist motor 40 in the first arrangement of operation.

FIG. 10 is a graph schematically illustrating an amount of energy regenerated by the clutch motor 30 and that regenerated by the assist motor 40 in the first arrangement of operation. When the crankshaft 56 of the gasoline engine 50 is rotated at a revolving speed Ne and a torque Te, the energy output from the gasoline engine 50 is expressed as the product of the revolving speed Ne and the torque Te. The output energy (Ne×Te) of the gasoline engine 50 corresponds to the energy of the sum of regions Gc+Ga as clearly shown in FIG. 10. The revolving speed Nc of the clutch motor 30 is expressed as the difference (Ne−Nd) between the revolving speed Ne of the crankshaft 56 and the revolving speed Nd of the drive shaft 22. The torque Tc of the clutch motor 30 is equal in magnitude to the torque Te of the gasoline engine 50. Among the output energy of the gasoline engine 50, the energy regenerated as electric power by the clutch motor 30 corresponds to the energy of the region Gc. The revolving speed of the assist motor 40 is given as the revolving speed Nd of the drive shaft 22, while the torque Ta of the assist motor 40 is equal in magnitude to the torque Tc of the clutch motor 30. The energy regenerated as electric power by the assist motor 40 thus corresponds to the energy of the residual region Ga. The regenerated energy of the region Gc and that of the region Ga are supplied to the battery 94. In the first arrangement of operation, the output energy of the gasoline engine 50 corresponding to the sum of the regions Gc+Ga is accordingly stored in the battery 94.

There are naturally certain amounts of energy loss in the clutch motor 30, the assist motor 40, the first driving circuit 91, and the second driving circuit 92. In the practical state, it is rather difficult to store all the output energy of the gasoline engine 50 corresponding to the sum of the regions Gc+Ga into the battery 94. The energy loss in the clutch motor 30 and the assist motor 40 is relatively small since some synchronous motors recently developed have the efficiency very close to 1. The energy loss in the first driving circuit 91 and the second driving circuit 92 can also be sufficiently small since the ON-state resistance of known transistors, such as GTOs, applicable to Tr1 through Tr16 is extremely small.

Figure 11:
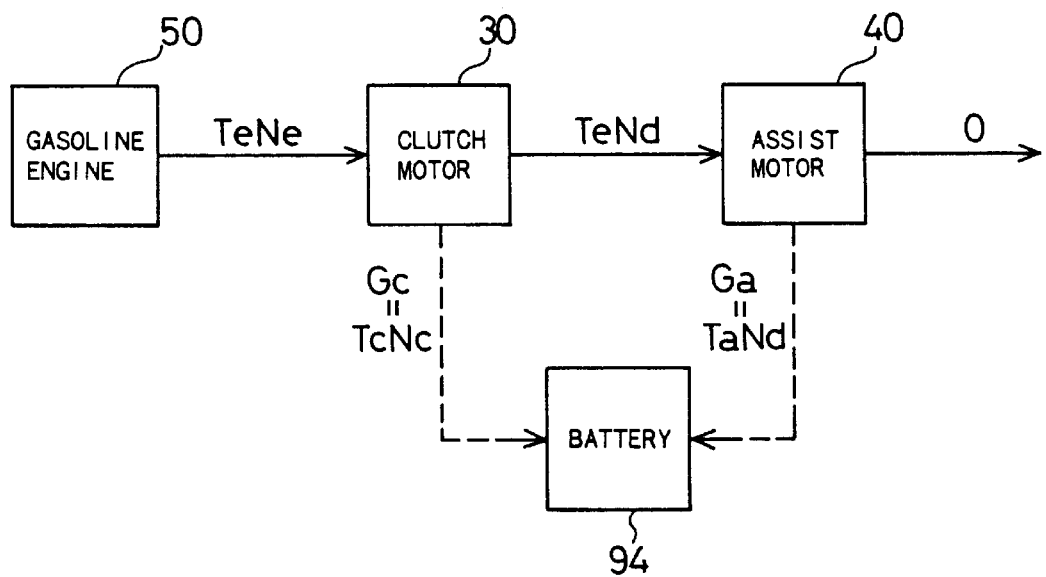
FIG. 11 shows a flow of energy between the gasoline engine 50, the clutch motor 30, the assist motor 40, and the battery 94 in the first arrangement of operation.

FIG. 11 shows a flow of energy between the gasoline engine 50, the clutch motor 30, the assist motor 40, and the battery 94 in the first arrangement of operation. Mechanical energy (Te×Ne) corresponding to the sum of the regions Gc+Ga produced by the gasoline engine 50 is transmitted to the clutch motor 30. The clutch motor 30 converts part of the mechanical energy transmitted from the gasoline engine 50 to electrical energy (Tc×Nc) of the region Gc and supplies the electrical energy (Tc×Nc) to the battery 94. The clutch motor 30 concurrently transmits the residual mechanical energy (Te×Nd) to the assist motor 40. The assist motor 40 converts all the mechanical energy (Te×Nd) transmitted from the clutch motor 30 to electrical energy (Ta×Nd) of the region Ga. The assist motor 30 supplies the electrical energy (Ta×Nd) to the battery 94, while not transmitting any mechanical energy to the drive shaft 22. The battery 94 then stores the total of supplied electrical energy (Tc×Nc+Ta×Nd) corresponding to the sum of the regions Gc+Ga.

Figure 12:
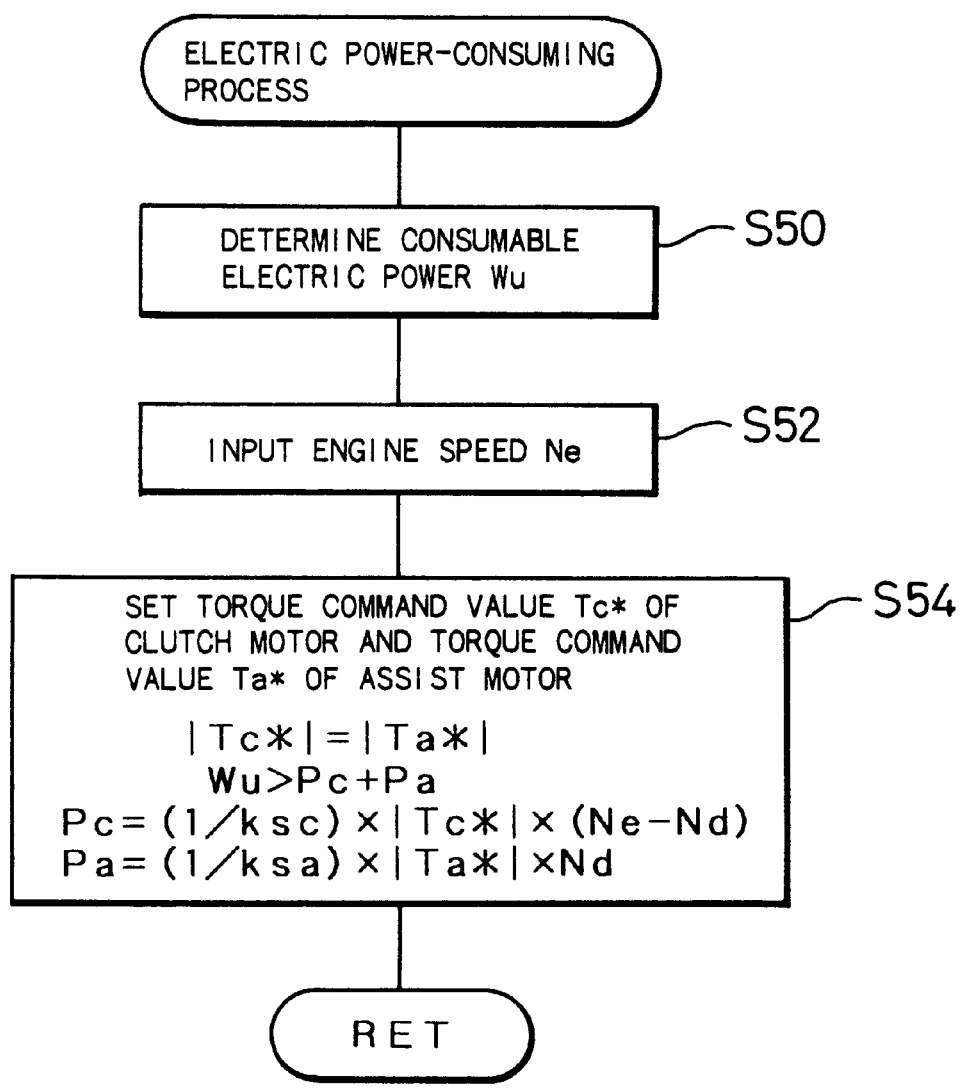
FIG. 12 is a flowchart showing details of an electric power-consuming process executed at step S36 in the flowchart of FIG. 6.

FIG. 12 is a flowchart showing details of the electric power-consuming process executed at step S36 in the flowchart of FIG. 6. When the program enters the routine of electric power-consuming process, the control CPU 90 of the controller 80 first determines consumable electric power Wu, which can be taken out of the battery 94, at step S50. The electric power exceeding this consumable electric power Wu can not be taken out of the battery 94. The consumable electric power Wu depends upon the residual capacity BRM of the battery 94. The consumable electric power Wu is thus calculated from the residual capacity BRM of the battery 94 measured by the residual capacity meter 99.

At subsequent step S52, the control CPU 90 receives data of revolving speed Ne of the gasoline engine 50. The revolving speed Ne of the gasoline engine 50 may be computed from the rotational angle θe of the crankshaft 56 read from the resolver 39 or directly measured by the speed sensor 76 mounted on the distributor 60. In the latter case, the control CPU 90 receives data of revolving speed Ne of the gasoline engine 50 through communication with the EFIECU 70, which connects with the speed sensor 76.

The control CPU 90 subsequently sets the torque command value Tc* of the clutch motor 30 and the torque command value Ta* of the assist motor 40 at step S54. The torque command values Tc* and Ta* are determined to satisfy the following two requirements.

In the second arrangement of operation shown in FIG. 5 when both the clutch motor 30 and the assist motor 40 are controlled to carry out the power operation, in order to set the output torque Td of the drive shaft 22 practically equal to zero, it is required to make the torque Tc of the clutch motor 30 and the torque Ta of the assist motor 40 substantially equal in magnitude to each other and cancel each other on the drive shaft 22. The first requirement is thus to set the torque command value Tc* of the clutch motor 30 equal in magnitude to the torque command value Ta* of the assist motor 40 as given below:

$$|Tc^*|=|Ta^*|$$

It is also required to make the total of electric power consumed by the clutch motor 30 and the assist motor 40 less than the consumable electric power Wu which can be taken out of the battery 94. The second requirement is thus to set the torque command value Tc* of the clutch motor 30 and the torque command value Ta* of the assist motor 40 which can fulfill the relationship that the sum of electric power Pc consumed by the clutch motor 30 and electric power Pa consumed by the assist motor 40 is less than the consumable electric power Wu as given below:

$$Wu>Pa+Pc$$

The electric power Pc consumed by the clutch motor 30 is expressed as:

$$Pc=(1/ksc)\times|Tc^*|\times(Nd-Ne)$$

wherein ksc represents the efficiency of power operation of the clutch motor 30. The electric power Pa consumed by the assist motor 40 is expressed as:

$$Pa=(1/ksa)\times|Ta^*|\times Nd$$

wherein ksa represents the efficiency of power operation of the assist motor 40.

After concluding the processing of step S54, the program exits from the routine of electric power-consuming process of FIG. 12 and returns to the control routine shown in the flowchart of FIG. 6. The control CPU 90 carries out the control procedures to control the clutch motor 30 at step S38, the assist motor 40 at step S40, and the gasoline engine 50 at step S42. The control processes of the clutch motor 30 and the assist motor 40 in the second arrangement of operation are similar to those of FIGS. 8 and 9 executed in the first arrangement of operation. Unlike the first arrangement of operation, however, both the clutch motor 30 and the assist motor 40 are controlled to implement not the regenerative operation but the power operation in the second arrangement of operation. The torques produced by the clutch motor 30 and the assist motor 40 in the second arrangement of operation are accordingly opposite in direction to those in the first arrangement of operation. Note that the torque command value Tc* of the clutch motor 30 and the torque command value Ta* of the assist motor 40 in the second arrangement thereby have reverse signs to those in the first arrangement.

The control of the gasoline engine 50 does not follow the method carried out in the first arrangement of operation. In the second arrangement of operation, the gasoline engine 50 is controlled to come into an idling state in order to attain an effect of engine brake. In accordance with a concrete procedure, the control CPU 90 sends an instruction to the EFIECU 70 through communication to enable the EFIECU 70 to decrease the amount of fuel injection or the throttle valve position. Such regulation makes the gasoline engine 50 fall in an idling state. As shown in FIG. 5, the friction torque having the same magnitude as that of the torque Tc of the clutch motor 30 is applied to the crankshaft 56 in the reverse of the rotation of the crankshaft 56. The friction torque includes the torque produced by the actual friction as well as the torque produced as resistivity in the gasoline engine 50 when the air in cylinder is compressed by the piston or when the air is ingested into the cylinder. When the gasoline engine 50 has a function of exhaust braking, a greater torque may be produced by activating the exhaust brake.

In accordance with another preferred structure, the fuel injection may be stopped to cease the operation of the gasoline engine 50. This structure also enables the friction torque by the gasoline engine 50 to be applied to the crankshaft 56.

In the second arrangement of operation, both the clutch motor 30 and the assist motor 40 are controlled to implement the power operation with the electric power supplied from the battery 94 and thereby consume the electric power stored in the battery 94. The power operation of the clutch motor 30 and the assist motor 40 causes the torque Tc of the clutch motor 30 to act on the drive shaft 22 opposite in direction to the torque Ta of the assist motor 40. Since the torque Tc and the torque Ta are equal to each other in magnitude, the torque Tc and the torque Ta cancel each other on the drive shaft 22. This makes the output torque Td of the drive shaft 22 substantially equal to zero, thereby realizing a free running state of the vehicle.

Figure 13:
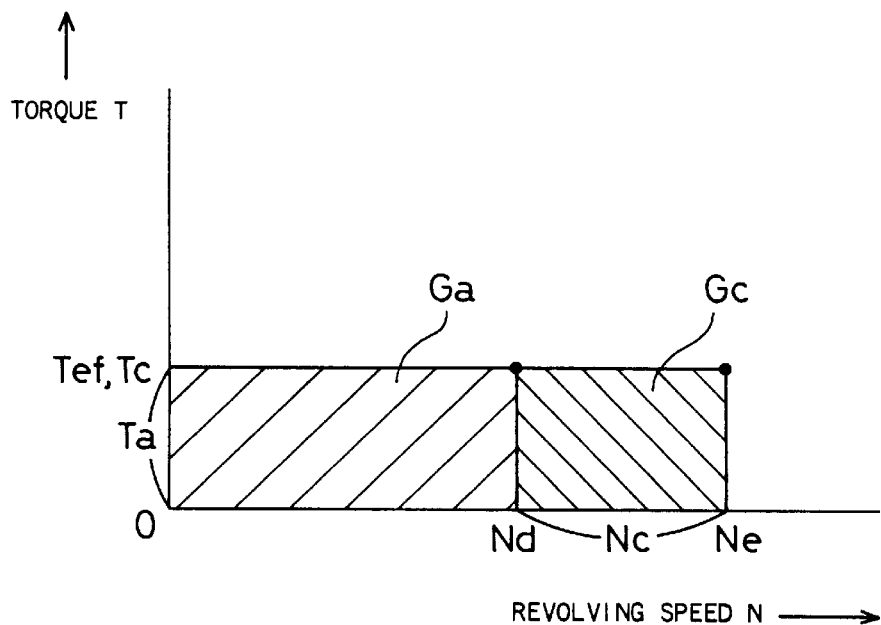
FIG. 13 is a graph schematically illustrating an amount of energy converted by the clutch motor 30 and that converted by the assist motor 40 in the second arrangement of operation.

FIG. 13 is a graph schematically illustrating an amount of energy converted by the clutch motor 30 and that converted by the assist motor 40 in the second arrangement of operation. The clutch motor 30 produces the torque Tc while rotating at the revolving speed Nc, which is expressed as the difference (Ne−Nd) between the revolving speed Ne of the crankshaft 56 and the revolving speed Nd of the drive shaft 22. Among the electric power stored in the battery 94, the clutch motor 30 consumes electric power corresponding to the energy of a region Gc and converts the electric power Gc to mechanical energy. The revolving speed of the assist motor 40 is given as the revolving speed Nd of the drive shaft 22, while the torque Ta of the assist motor 40 is equal in magnitude to the torque Tc of the clutch motor 30. Among the electric power stored in the battery 94, the assist motor 40 consumes electric power corresponding to the energy of a region Ga and converts the electric power Ga to mechanical energy. The crankshaft 56 of the gasoline engine 50 is rotated at the revolving speed Ne, while the gasoline engine 50 produces the friction torque Tef, which is equal in magnitude to the torque Tc of the clutch motor 30. The gasoline engine 50 accordingly converts energy corresponding to the sum of the regions Gc+Ga to frictional heat or work heat. Among the energy stored as electric power in the battery 94, the energy corresponding to the sum of the regions Gc+Ga is transmitted to the gasoline engine 50 via the clutch motor 30 and the assist motor 40 and eventually consumed and converted to heat or another form of energy by the gasoline engine 50.

Figure 14:
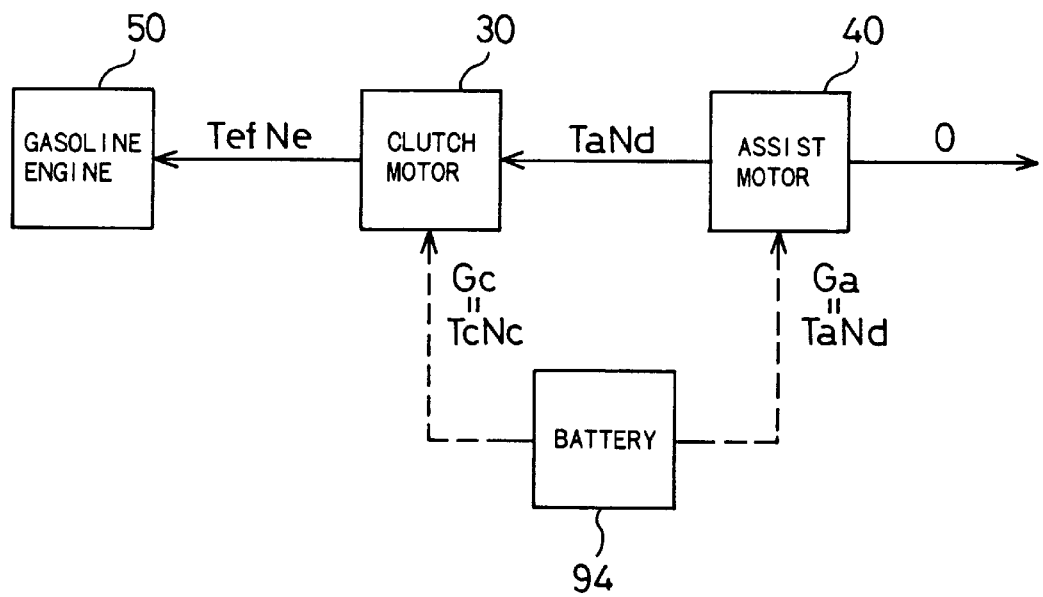
FIG. 14 shows a flow of energy between the gasoline engine 50, the clutch motor 30, the assist motor 40, and the battery 94 in the second arrangement of operation.

FIG. 14 shows a flow of energy between the gasoline engine 50, the clutch motor 30, the assist motor 40, and the battery 94 in the second arrangement of operation. Among the electrical energy stored in the battery 94, part of electrical energy (Tc×Nc) corresponding to the region Gc is supplied to the clutch motor 30, whereas another part of electrical energy (Ta×Nd) corresponding to the region Ga is supplied to the assist motor 40. The assist motor 40 converts the electrical energy (Ta×Nd) of the region Ga supplied from the battery 94 to mechanical energy (Ta×Nd) of the region Ga. The assist motor 40 transmits all the mechanical energy (Ta×Nd) to the clutch motor 30, while not transmitting any mechanical energy to the drive shaft 22. The clutch motor 30 converts the electrical energy (Tc×Nc) of the region Gc supplied from the battery 94 to mechanical energy and transmits the sum (Tef×Ne) of the mechanical energy transmitted from the assist motor 40 and that converted by the clutch motor 30 to the gasoline engine 50. The gasoline engine 50 converts the total mechanical energy (Tef×Ne) corresponding to the sum of the regions Gc+Ga transmitted from the clutch motor 30 to heat or another form of energy.

Figure 15:
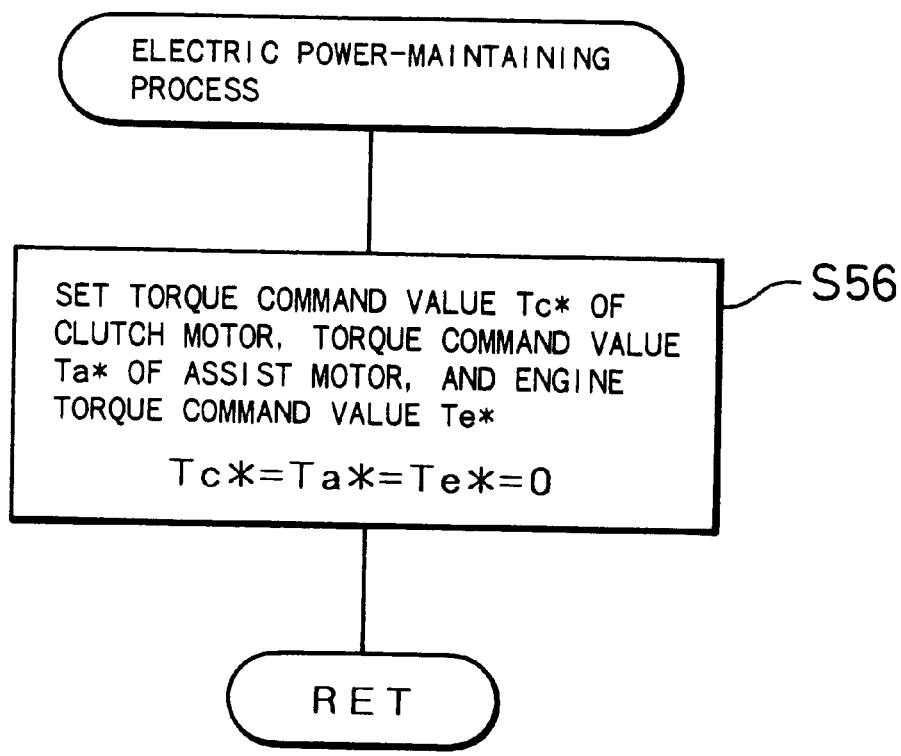
FIG. 15 is a flowchart showing details of an electric power-maintaining process executed at step S34 in the flowchart of FIG. 6.

FIG. 15 is a flowchart showing details of the electric power-maintaining process executed at step S34 in the flowchart of FIG. 6. When the program enters the routine of electric power-maintaining process, the control CPU 90 of the controller 80 sets the torque command value Tc* of the clutch motor 30, the torque command value Ta* of the assist motor 40, and the torque command value Te* of the gasoline engine 50 (engine torque command value) at step S56. In the third arrangement of operation, the torque command value Tc* of the clutch motor 30 and the torque command value Ta* of the assist motor are respectively set equal to zero, in order to cease the operation of the clutch motor 30 and the assist motor 40 and prevent electric currents from flowing through the three-phase coils 36 of the clutch motor 30 and the three-phase coils 44 of the assist motor 40. The torque command value Te* of the gasoline engine 50 is also set equal to zero in order to cease the operation of the gasoline engine:

$$Tc^* = Ta^* = Te^* = 0$$

After concluding the processing of step S56, the program exits from the routine of electric power-maintaining process of FIG. 15 and returns to the control routine shown in the flowchart of FIG. 6. The control CPU 90 carries out the control procedures to control the clutch motor 30 at step S38, the assist motor 40 at step S40, and the gasoline engine 50 at step S42. Since all the torque command values of the clutch motor 30, the assist motor 40, and the gasoline engine 50 are equal to zero, the clutch motor 30, the assist motor 40, and the gasoline engine 50 all stop the operation. In accordance with a concrete procedure, the control CPU 90 controls the first driving circuit 91 to prevent an electric current from flowing through the three-phase coils 36 of the clutch motor 30 while controlling the second driving circuit 92 to prevent an electric current from flowing through the three-phase coils 44 of the assist motor 40. The control CPU 90 also sends an instruction to the EFIECU 70 to stop the fuel injection into the gasoline engine 50.

In the third arrangement of operation, both the clutch motor 30 and the assist motor 40 are controlled to stop working and prevent electric currents from flowing through the respective three-phase coils 36 and 44 of the clutch motor 30 and the assist motor 40. The control CPU 90 thus substantially disconnects the electromagnetic coupling of the outer rotor 32 with the inner rotor 34 in the clutch motor 30 as well as the electromagnetic coupling of the rotor 42 with the stator 43 in the assist motor 40. Under such conditions, no torques are applied to the drive shaft 22 by either the clutch motor 30 or the assist motor 40. The output torque of the drive shaft 22 thus becomes substantially equal to zero, thereby realizing a free running state of the vehicle. Since the operation of the gasoline engine 50 is also ceased, no fuel is consumed in the free running state of the vehicle. In accordance with an alternative structure, the gasoline engine 50 may not stop working but be kept at an idle.

In the structure of the first embodiment, the above control processes make the torque output to the drive shaft 22 substantially equal to zero, thereby realizing a free running state of the vehicle. When the residual capacity BRM of the battery 94 is less than the allowable minimum value Bmin, the structure of the first embodiment enables the vehicle to fall in the free running state while supplementing the electric power of the battery 94. When the residual capacity BRM of the battery 94 is greater than the allowable maximum value Bmax, on the contrary, the structure of the first embodiment enables the vehicle to fall in the free running state while consuming the electric power of the battery 94.

The power output apparatus 20 of the first embodiment can go into another application given as a second embodiment of the present invention. In the first embodiment, the vehicle is set into a free running state while being driven under the normal driving condition (that is, when the drive shaft 22 is rotated at a lower revolving speed than that of the crankshaft 56 of the gasoline engine 50). It is also possible to make the vehicle come into the free running state while being driven under the high-speed driving condition or overdrive condition. In the overdrive state, the drive shaft 22 is rotated at a revolving speed higher than that of the crankshaft 56 of the gasoline engine 50. In the second embodiment, the vehicle is set into the free running state while being driven under the high-speed driving condition or overdrive condition.

The following describes the operation when the vehicle is driven in the overdrive state and runs, for example, an expressway at a high speed. By way of example, it is assumed that the gasoline engine 50 driven by the EFIECU 70 rotates at a predetermined revolving speed Ne and that the drive shaft 22 rotates in the direction of rotation of the crankshaft 56 at a revolving speed Nd higher than the predetermined revolving speed Ne (Nd>Ne).

In the same manner as the first embodiment, the control CPU 90 of the controller 80 refers to the output data of the residual capacity meter 99 and determines whether the residual capacity BRM of the battery 94 is out of the allowable range or within the allowable range. The control CPU 90 controls the first and the second driving circuits 91 and 92 based on the results of determination.

When the residual capacity BRM of the battery 94 is smaller than the allowable minimum value Bmin and thus determined to be out of the allowable range, the power output apparatus 20 is set into a fourth arrangement of operation. In the fourth arrangement of operation, the assist motor 40 is controlled to carry out the regenerative operation and regenerate electric power via the second driving circuit 92. The clutch motor 30 is controlled via the first driving circuit 91 to implement the power operation with part of the regenerated electric power. The residual electric power is supplied to the battery 94 to supplement the electric power of the battery 94.

Torques applied to the drive shaft 22 and the crankshaft 56 of the power output apparatus 20 in the fourth arrangement of operation are identical with those illustrated in FIG. 4. By way of example, it is assumed that the crankshaft 56 of the gasoline engine 50 is rotated at a predetermined revolving speed Ne in the direction defined by the open arrow of FIG. 4, while the drive shaft 22 is rotated in the same direction defined by the open arrow at a revolving speed Nd, which is higher than the revolving speed Ne (Nd>Ne). When the clutch motor 30 is controlled to carry out the power operation, the crankshaft 56 receives a torque Tc produced by the clutch motor 30 in the reverse of the rotation of the crankshaft 56. The drive shaft 22, on the other hand, receives a torque Tc produced by the clutch motor 30 in the direction of rotation of the drive shaft 22. The torque Tc of the clutch motor 30 applied to the drive shaft 22 is a reaction of the torque Tc applied to the crankshaft 56. The torques Tc produced by the clutch motor 30 when the clutch motor 30 carries out the regenerative operation in the normal driving state (when the drive shaft 22 is rotated at the revolving speed Nd lower than the revolving speed Ne of the crankshaft 56) are equal in direction to those produced by the clutch motor 30 when the clutch motor 30 carries out the power operation in the high-speed driving state or overdrive state (when the drive shaft 22 is rotated at the revolving speed Nd higher than the revolving speed Ne of the crankshaft 56). The crankshaft 56 also receives a torque Te produced by the gasoline engine 50 in the direction of rotation of the crankshaft 56. In a stationary state where the revolving speed Ne of the crankshaft 56 is practically kept constant, the torque Te substantially balances with the torque Tc. This means that the magnitude of the torque Te is substantially equal to that of the torque Tc. When the assist motor 40 is controlled to carry out the regenerative operation, the drive shaft 22 receives a torque Ta produced by the assist motor 40 in the reverse of the rotation of the drive shaft 22. The torque Tc applied to the drive shaft 22 by the clutch motor 30 is opposite in direction to the torque Ta applied to the drive shaft 22 by the assist motor 40. Provided that the magnitude of the torque Tc is identical with that of the torque Ta, the torques Tc and Ta cancel each other on the drive shaft 22. The output torque Td of the drive shaft 22 thus becomes substantially equal to zero.

When the residual capacity BRM of the battery 94 is greater than the allowable maximum value Bmax and thus determined to be out of the allowable range, on the other hand, the power output apparatus 20 is set into a fifth arrangement of operation. In the fifth arrangement of operation, the clutch motor 30 is controlled to carry out the regenerative operation and regenerate electric power via the first driving circuit 91. The assist motor 40 carries out the power operation with the electric power regenerated by the clutch motor 30 and the electric power stored in the battery 94.

Torques applied to the drive shaft 22 and the crankshaft 56 of the power output apparatus 20 in the fifth arrangement of operation are identical with those illustrated in FIG. 5. By way of example, it is assumed that the crankshaft 56 of the gasoline engine 50 is rotated at a predetermined revolving speed Ne, while the drive shaft 22 is rotated in the same direction at a revolving speed Nd, which is higher than the revolving speed Ne (Nd>Ne). When the clutch motor 30 is controlled to carry out the regenerative operation, the crankshaft 56 receives a torque Tc produced by the clutch motor 30 in the direction of rotation of the crankshaft 56. The drive shaft 22, on the other hand, receives a torque Tc produced by the clutch motor 30 in the reverse of the rotation of the drive shaft 22. The torque Tc of the clutch motor 30 applied to the drive shaft 22 is a reaction of the torque Tc applied to the crankshaft 56. The torques Tc produced by the clutch motor 30 when the clutch motor 30 carries out the power operation in the normal driving state are equal in direction to those produced by the clutch motor 30 when the clutch motor 30 carries out the regenerative operation in the high-speed driving state or overdrive state. The torque Tc produced by the clutch motor 30 in the direction of rotation of the crankshaft 56 acts on the crankshaft 56 to enhance the rotation of the crankshaft 56. The gasoline engine 50 accordingly exerts an effect of engine brake and applies a friction torque Tef, which is equal in magnitude but opposite in direction to the torque Tc, to the crankshaft 56. When the assist motor 40 carries out the power operation, the drive shaft 22 receives a torque Ta produced by the assist motor 40 in the direction of rotation of the drive shaft 22. The torque Tc applied to the drive shaft 22 by the clutch motor 30 is opposite in direction to the torque Ta applied to the drive shaft 22 by the assist motor 40. Provided that the magnitude of the torque Tc is identical with that of the torque Ta, the torques Tc and Ta cancel each other on the drive shaft 22. The output torque Td of the drive shaft 22 thus becomes substantially equal to zero.

When the residual capacity BRM of the battery 94 is determined to be within the allowable range, the power output apparatus 20 is set into the third arrangement of operation in the same manner as described for the normal driving state. In this case, no torques are applied to the drive shaft 22 by either the clutch motor 30 or the assist motor 40. The output torque Td of the drive shaft 22 thus becomes substantially equal to zero.

In the high-speed driving state or overdrive state of the vehicle, the above control processes make the torque output to the drive shaft 22 substantially equal to zero, thereby realizing a free running state of the vehicle.

Figure 16:
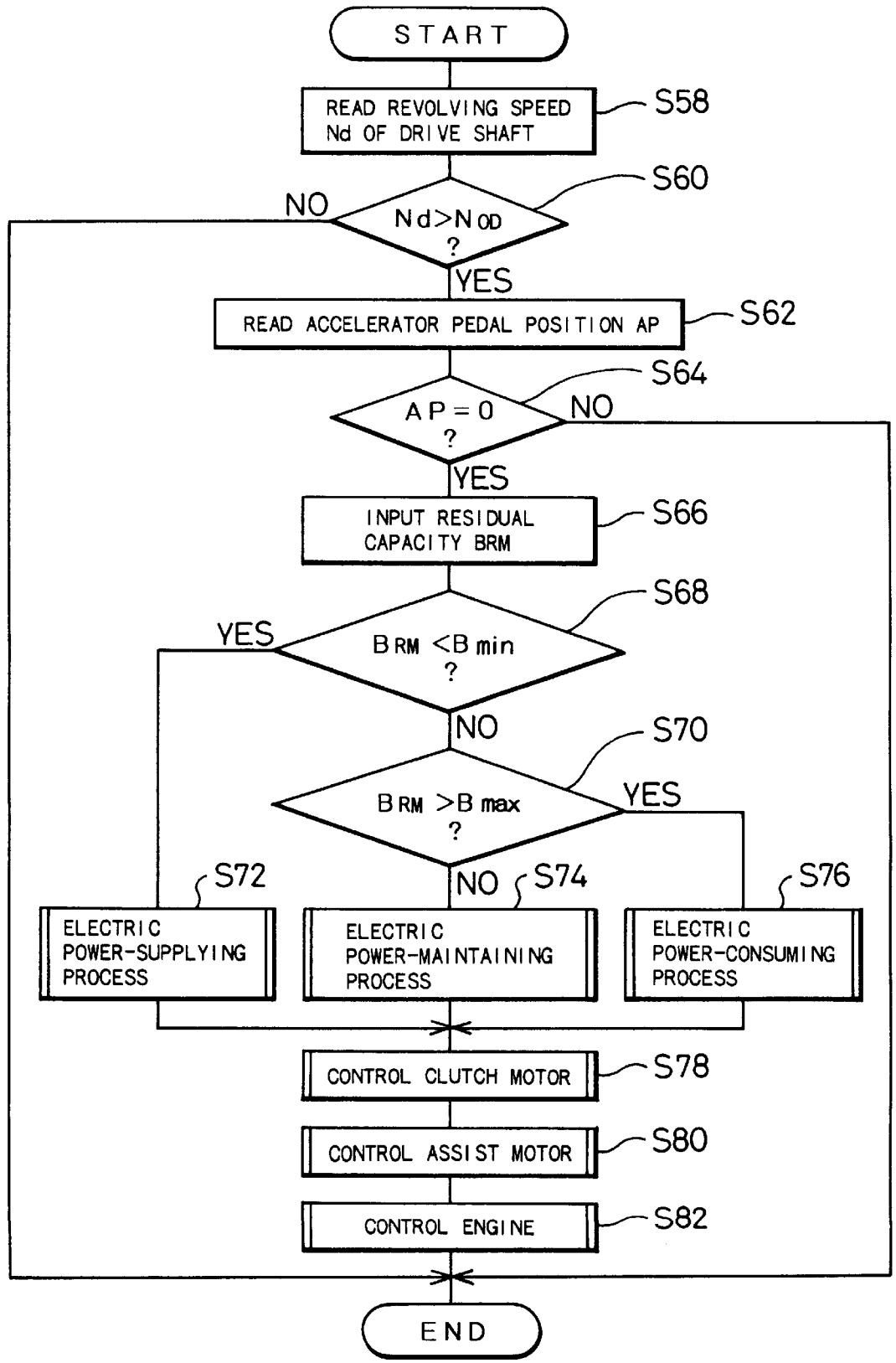
FIG. 16 is a flowchart showing a control routine executed by the control CPU 90 of the power output apparatus 20 to enable the vehicle to fall in a free running state under an overdrive condition as a second embodiment according to the present invention.

FIG. 16 is a flowchart showing a control routine executed by the control CPU 90 of the controller 80 to enable the vehicle to fall in a free running state under the overdrive condition in the power output apparatus 20 of the second embodiment. When the program enters the routine, the control CPU 90 first receives data of revolving speed Nd of the drive shaft 22 at step S58. The input revolving speed Nd of the drive shaft 22 is compared with a reference revolving speed NOD of the overdrive state at step S60. When the revolving speed Nd of the drive shaft 22 exceeds the reference revolving speed NOD at step S60, the program proceeds to step S62. When the revolving speed Nd is not greater than the reference revolving speed NOD, on the other hand, the program directly exits from this routine. The reference revolving speed NOD is set, for example, equal to a maximum value Nemax in a high-efficiency speed range of the gasoline engine 50. The gasoline engine 50 is generally controlled to be driven at the possible highest efficiency. The revolving speed Ne of the crankshaft 56 of the gasoline engine 50 is accordingly restricted into the high-efficiency speed range. When the revolving speed Nd of the drive shaft 22 is sufficiently low, the revolving speed Nd is kept lower than the revolving speed Ne of the crankshaft 56 of the gasoline engine 50. As the revolving speed Nd of the drive shaft 22 increases to exceed the maximum value Nemax in the high-efficiency speed range of the gasoline engine 50, the revolving speed Nd of the drive shaft 22 becomes higher than the revolving speed Ne of the crankshaft 56, which can not exceed the maximum value Nemax in the high-efficiency range. This corresponds to the overdrive state.

The processing executed at steps S62 through S70 is identical with that executed at steps S22 through S30 in the flowchart of FIG. 6 and is thus not described here. When the residual capacity BRM of the battery 94 is determined to be less than the allowable minimum value Bmin at step S68, the program goes to step S72 to execute an electric power-supplying process in order to realize the fourth arrangement of operation, in which the clutch motor 30 carries out the power operation and the assist motor 40 carries out the regenerative operation to supplement the electric power of the battery 94. When the residual capacity BRM of the battery 94 is determined to be greater than the allowable maximum value Bmax at step S70, on the other hand, the program goes to step S76 to execute an electric power-consuming process in order to realize the fifth arrangement of operation, in which the clutch motor 30 carries out the regenerative operation and the assist motor 40 carries out the power operation to consume the electric power stored in the battery 94.

When the residual capacity BRM of the battery 94 is determined to be within the allowable range at steps S68 and S70 (that is, when the residual capacity BRM is not less than the allowable minimum value Bmin and not greater than the allowable maximum value Bmax), the program goes to step S74 to execute an electric power-maintaining process in order to realize the third arrangement of operation, in which both the clutch motor 30 and the assist motor 40 are controlled to stop working and the battery 94 is kept in the current state. When the residual capacity BRM of the battery 94 is within the allowable range, the power output apparatus 20 is set into the third arrangement of operation discussed above. The processing of steps S74 and S78 through S82 is accordingly identical with that of steps S34 and S38 through S42 in the flowchart of FIG. 6.

The electric power-supplying process executed at step S72 in the flowchart of FIG. 16 follows the routine of FIG. 7 described for the first arrangement of operation.

After concluding the electric power-supplying process of step S72, the control CPU 90 carries out the control procedures to control the clutch motor 30 at step S78, the assist motor 40 at step S80, and the gasoline engine 50 at step S82. The control procedures of the clutch motor 30 and the assist motor 40 follow the routines of FIGS. 8 and 9 described for the first arrangement of operation. The control procedure of the gasoline engine 50 is also identical with that explained for the first arrangement of operation.

In the fourth arrangement of operation, the assist motor 40 is controlled to implement the regenerative operation, whereas the clutch motor 30 is controlled to implement the power operation with part of the electric power regenerated by the assist motor 40. The torque Tc of the clutch motor 30 acts on the drive shaft 22 opposite in direction to the torque Ta of the assist motor 40. Since the torque Tc and the torque Ta are equal in magnitude to each other, the torque Tc and the torque Ta cancel each other on the drive shaft 22. The output torque Td of the drive shaft 22 thus becomes substantially equal to zero, thereby realizing a free running state of the vehicle. The residual electric power regenerated by the assist motor 40 is supplied to the battery 94 to supplement the electric power of the battery 94.

Figure 17:
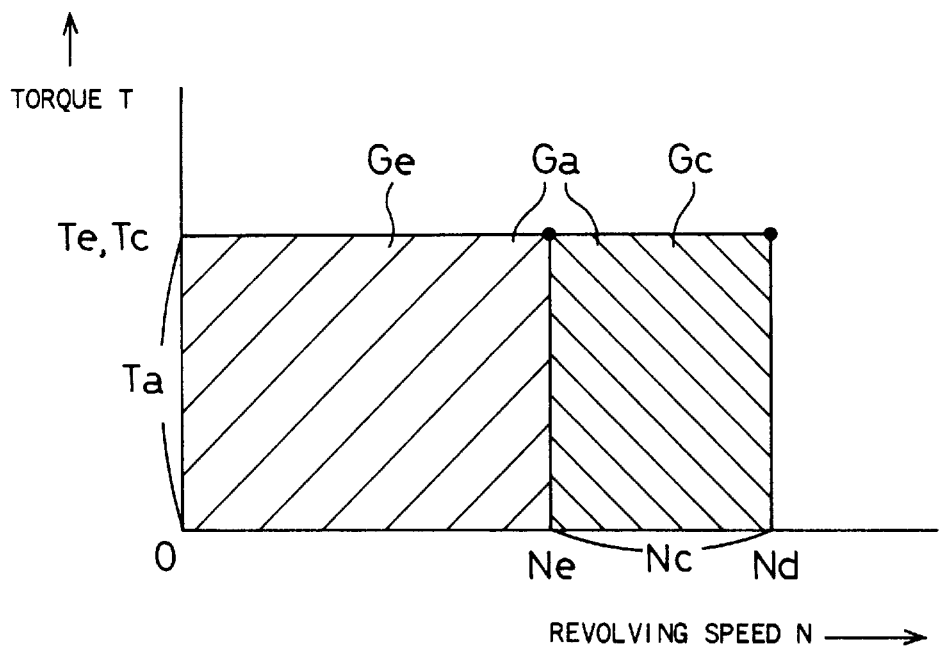
FIG. 17 is a graph schematically illustrating an amount of energy converted by the clutch motor 30 and that regenerated by the assist motor 40 in a fourth arrangement of operation.

FIG. 17 is a graph schematically illustrating an amount of energy converted by the clutch motor 30 and that regenerated by the assist motor 40 in the fourth arrangement of operation. When the crankshaft 56 of the gasoline engine 50 is rotated at a revolving speed Ne and a torque Te, the energy output from the gasoline engine 50 is expressed as the product of the revolving speed Ne and the torque Te. The output energy (Ne×Te) of the gasoline engine 50 corresponds to the energy of a region Ge as clearly shown in FIG. 17. The revolving speed Nc of the clutch motor 30 is expressed as the difference (Nd−Ne) between the revolving speed Nd of the drive shaft 22 and the revolving speed Ne of the crankshaft 56. The torque Tc of the clutch motor 30 is equal in magnitude to the torque Te of the gasoline engine 50. Energy converted from the electric power by the clutch motor 30 corresponds to the energy of a region Gc. The revolving speed of the assist motor 40 is given as the revolving speed Nd of the drive shaft 22, while the torque Ta of the assist motor 40 is equal in magnitude to the torque Tc of the clutch motor 30. The energy regenerated as electric power by the assist motor 40 thus corresponds to the energy of a region Ga, which is the sum of the energy of the region Ge produced by the gasoline engine 50 and the energy of the region Gc produced by the clutch motor 30. Among the energy of the region Ga thus regenerated as electric power, the energy of the region Gc is supplied back to the clutch motor 30, whereas the energy of the residual region Ge is supplied to and stored into the battery 94. In the fourth arrangement of operation, the energy of the region Ge output from the gasoline engine 50 is directly stored into the battery 94.

There are naturally certain amounts of energy loss in the clutch motor 30, the assist motor 40, the first driving circuit 91, and the second driving circuit 92. In the practical state, it is rather difficult to store all the output energy of the gasoline engine 50 corresponding to the region Ge into the battery 94. The energy loss in the clutch motor 30 and the assist motor 40 is relatively small since some synchronous motors recently developed have the efficiency very close to 1.

Figure 18:
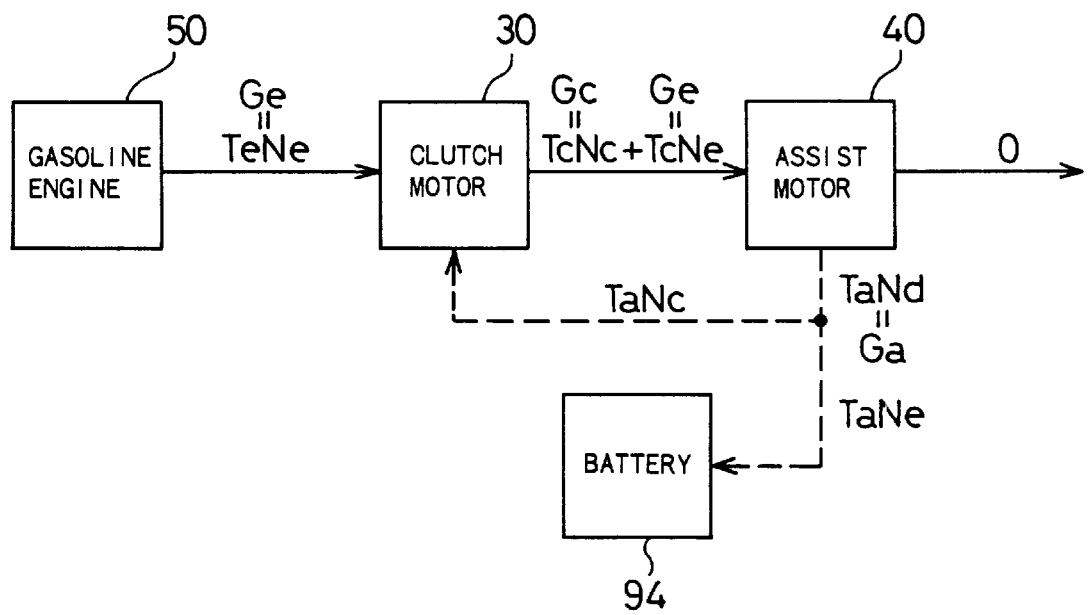
FIG. 18 shows a flow of energy between the gasoline engine 50, the clutch motor 30, the assist motor 40, and the battery 94 in the fourth arrangement of operation.

FIG. 18 shows a flow of energy between the gasoline engine 50, the clutch motor 30, the assist motor 40, and the battery 94 in the fourth arrangement of operation. Mechanical energy (Te×Ne) of the region Ge produced by the gasoline engine 50 is transmitted to the clutch motor 30. The clutch motor 30 converts electrical energy (Ta×Nc) supplied from the assist motor 40 to mechanical energy (Tc×Nc) of the region Gc, and transmits the sum of the converted mechanical energy (Tc×Nc) of the region Gc and the mechanical energy (Te×Ne) of the region Ge transmitted from the gasoline engine 50 to the assist motor 40. The assist motor 40 does not transmit any mechanical energy, which has been transmitted from the clutch motor 30, to the drive shaft 22, but converts all the transmitted mechanical energy to electrical energy (Ta×Nd) corresponding to the region Ga. Part of the electrical energy (Ta×Nc) is supplied to the clutch motor 30, while the residual electrical energy (Ta×Ne) is supplied to the battery 94. The battery 94 is then charged with the supplied electrical energy (Ta×Ne).

Figure 19:
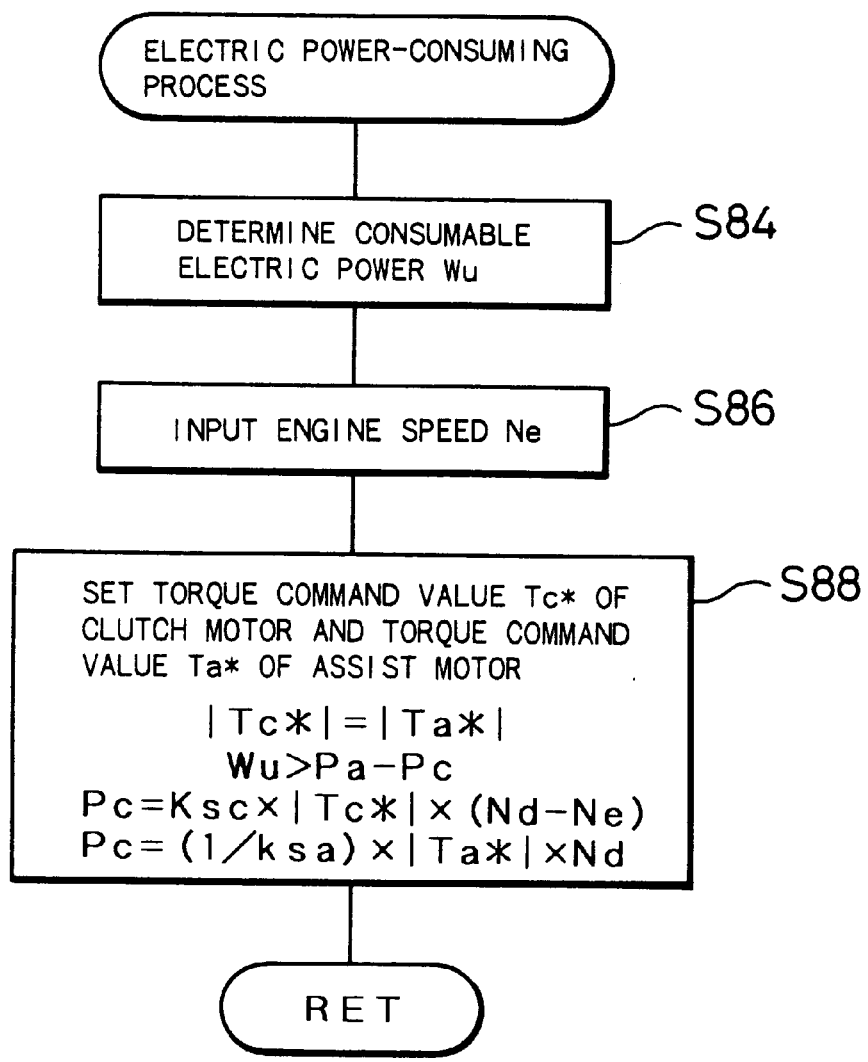
FIG. 19 is a flowchart showing details of an electric power-consuming process executed at step S76 in the flowchart of FIG. 16.

FIG. 19 is a flowchart showing details of the electric power-consuming process executed at step S76 in the flowchart of FIG. 16. The processing of steps S84 and S86 in the flowchart of FIG. 19 are identical with that of steps S50 and S52 in the flowchart of FIG. 12. The control CPU 90 subsequently sets the torque command value Tc* of the clutch motor 30 and the torque command value Ta* of the assist motor 40 at step S88. The torque command values Tc* and Ta* are determined to satisfy the following two requirements.

In the fifth arrangement of operation described with the drawing of FIG. 5 when the clutch motor 30 implements the regenerative operation while the assist motor 40 carrying out the power operation, in order to set the output torque Td of the drive shaft 22 practically equal to zero, it is required to make the torque Tc of the clutch motor 30 and the torque Ta of the assist motor 40 substantially equal in magnitude to each other and cancel each other on the drive shaft 22. The first requirement is thus to set the torque command value Tc* of the clutch motor 30 equal in magnitude to the torque command value Ta* of the assist motor 40 as given below:

$$|Tc^*|=|Ta^*|$$

The electric power stored in the battery 94 compensates for a specific part of electric power, which is consumed by the assist motor 40 but not covered by the electric power regenerated by the clutch motor 30. The specific part of electric power should be less than the consumable electric power Wu which can be taken out of the battery 94. The second requirement is thus to set the torque command value Tc* of the clutch motor 30 and the torque command value Ta* of the assist motor 40 which can fulfill the relationship that the residual electric power obtained by subtracting electric power Pc regenerated by the clutch motor 30 from electric power Pa consumed by the assist motor 40 is less than the consumable electric power Wu as given below:

$$Wu>Pa-Pc$$

The electric power Pc regenerated by the clutch motor 30 is expressed as:

$$Pc=Ksc\times|Tc^*|\times(Nd-Ne)$$

wherein Ksc represents the efficiency of regenerative operation of the clutch motor 30. The electric power Pa consumed by the assist motor 40 is expressed as:

$$Pa=(1/ksa)\times|Ta^*|\times Nd$$

wherein ksa represents the efficiency of power operation of the assist motor 40.

After concluding the processing of step S88, the program exits from the routine of electric power-consuming process of FIG. 19 and returns to the control routine shown in the flowchart of FIG. 16. The control CPU 90 carries out the control procedures to control the clutch motor 30 at step S78, the assist motor 40 at step S80, and the gasoline engine 50 at step S82. The control processes of the clutch motor 30 and the assist motor 40 in the fifth arrangement of operation follow the routines of FIGS. 8 and 9 in the same manner as the fourth arrangement of operation. Whereas the clutch motor 30 carries out the power operation and the assist motor 40 the regenerative operation in the fourth arrangement of operation, the clutch motor 30 carries out the regenerative operation and the assist motor 40 the power operation in the fifth arrangement of operation. The torques produced by the clutch motor 30 and the assist motor 40 in the fifth arrangement of operation are accordingly opposite in direction to those in the fourth arrangement of operation. Note that the torque command value Tc* of the clutch motor 30 and the torque command value Ta* of the assist motor 40 in the fifth arrangement thereby have reverse signs to those in the fourth arrangement.

Like the second arrangement of operation, the gasoline engine 50 is controlled to come into an idling state in order to attain an effect of engine brake in the fifth arrangement of operation. In accordance with a concrete procedure, the control CPU 90 sends an instruction to the EFIECU 70 through communication to enable the EFIECU 70 to decrease the amount of fuel injection or the throttle valve position. Such regulation makes the gasoline engine 50 fall in an idling state. In another preferred structure, the fuel injection may be stopped to cease the operation of the gasoline engine 50.

In the fifth arrangement of operation, the assist motor 40 is controlled to implement the power operation with the electric power regenerated by the clutch motor 30 as well as the electric power supplied from the battery 94. This structure consumes the electric power stored in the battery 94. The regenerative operation of the clutch motor 30 concurrently with the power operation of the assist motor 40 causes the torque Tc of the clutch motor 30 to act on the drive shaft 22 opposite in direction to the torque Ta of the assist motor 40. Since the torque Tc and the torque Ta are equal to each other in magnitude, the torque Tc and the torque Ta cancel each other on the drive shaft 22. This makes the output torque Td of the drive shaft 22 substantially equal to zero, thereby realizing a free running state of the vehicle.

Figure 20:
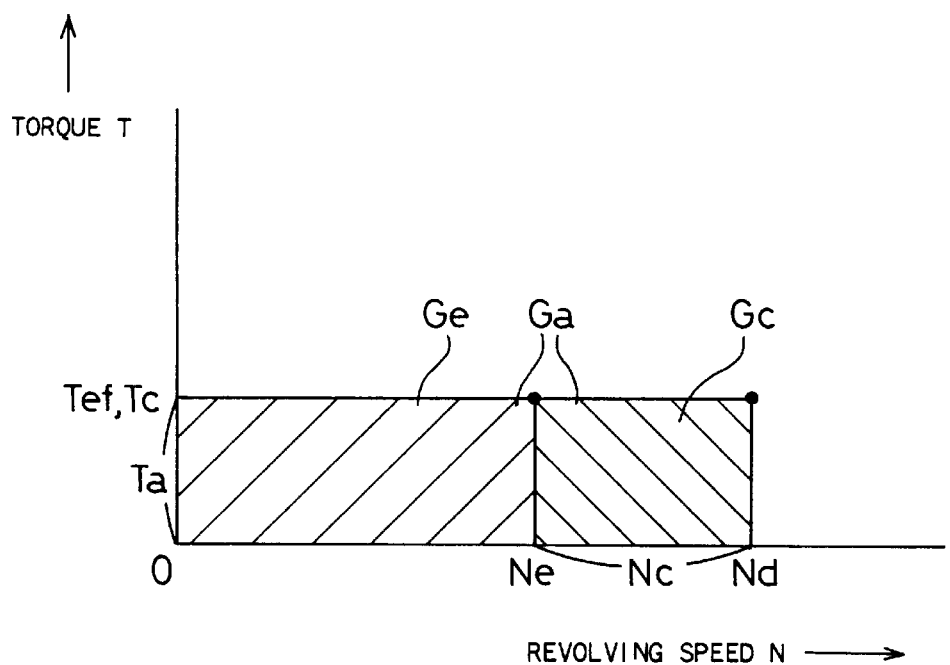
FIG. 20 is a graph schematically illustrating an amount of energy regenerated by the clutch motor 30 and that converted by the assist motor 40 in a fifth arrangement of operation.

FIG. 20 is a graph schematically illustrating an amount of energy regenerated by the clutch motor 30 and that converted by the assist motor 40 in the fifth arrangement of operation. The clutch motor 30 produces the torque Tc while rotating at the revolving speed Nc, which is expressed as the difference (Nd−Ne) between the revolving speed Nd of the drive shaft 22 and the revolving speed Ne of the crankshaft 56. The clutch motor 30 accordingly regenerates the energy of a region Gc as electric power. The revolving speed of the assist motor 40 is given as the revolving speed Nd of the drive shaft 22, while the torque Ta of the assist motor 40 is equal in magnitude to the torque Tc of the clutch motor 30. The assist motor 40 accordingly consumes electric power corresponding to the energy of a region Ga and converts the electric power Ga to mechanical energy. Among the electric power consumed and converted by the assist motor 40, the electric power corresponding to the energy of a region Ge is supplied from the battery 94. The mechanical energy produced by the assist motor 40 is partly regenerated as electric power by the clutch motor 30, while the mechanical energy of the residual region Ge is transmitted to the gasoline engine 50. The crankshaft 56 of the gasoline engine 50 is rotated at the revolving speed Ne, while the gasoline engine 50 produces the friction torque Tef, which is equal in magnitude to the torque Tc of the clutch motor 30. The gasoline engine 50 accordingly converts the transmitted energy of the region Ge to frictional heat or work heat. Among the energy stored as electric power in the battery 94, the energy corresponding to the region Ge is transmitted to the gasoline engine 50 via the clutch motor 30 and the assist motor 40 and eventually consumed and converted to heat or another form of energy by the gasoline engine 50.

Figure 21:
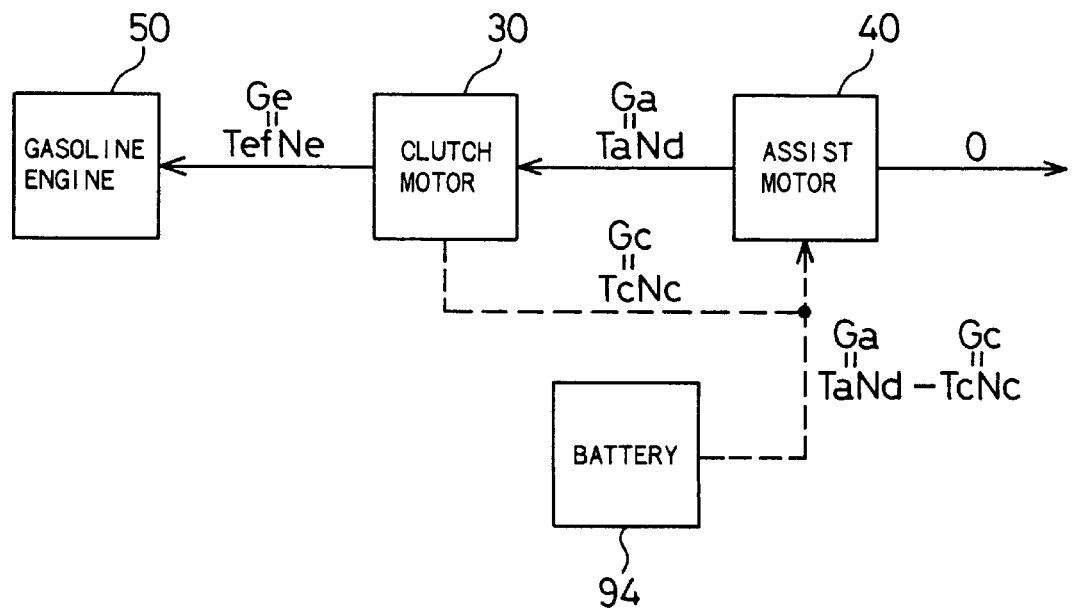
FIG. 21 shows a flow of energy between the gasoline engine 50, the clutch motor 30, the assist motor 40, and the battery 94 in the fifth arrangement of operation.

FIG. 21 shows a flow of energy between the gasoline engine 50, the clutch motor 30, the assist motor 40, and the battery 94 in the fifth arrangement of operation. The electrical energy (Ta×Nd−Tc×Nc) of the region Ga-Gc stored in the battery 94 is supplied to the assist motor 40. The assist motor 40 converts the sum of the electrical energy (Ta×Nd−Tc×Nc) of the region Ga−Gc supplied from the battery 94 and the electrical energy (Tc×Nc) of the region Gc supplied from the clutch motor 30 to mechanical energy (Ta×Nd) corresponding to the region Ga. The assist motor 40 transmits all the mechanical energy (Ta×Nd) to the clutch motor 30 while not transmitting any mechanical energy to the drive shaft 22. The clutch motor 30 converts part of the mechanical energy (Ta×Nd) of the region Ga transmitted from the assist motor 40 to electrical energy (Tc×Nc) of the region Gc, which is supplied back to the assist motor 40. The residual mechanical energy (Tef×Ne) corresponding to the region Ge is transmitted from the clutch motor 30 to the gasoline engine 50. The gasoline engine 50 converts the mechanical energy (Tef×Ne) of the region Ge transmitted from the clutch motor 30 to heat or another form of energy.

In the structure of the second embodiment, when the vehicle runs under the high-speed driving condition or overdrive condition (that is, when the drive shaft 22 is rotated at a revolving speed higher than that of the crankshaft 56 of the gasoline engine 50), the above control processes make the torque output to the drive shaft 22 substantially equal to zero, thereby realizing a free running state of the vehicle. Under the high-speed driving condition, when the residual capacity BRM of the battery 94 is less than the allowable minimum value Bmin, the structure of the second embodiment enables the vehicle to fall in the free running state while supplementing the electric power of the battery 94. When the residual capacity BRM of the battery 94 is greater than the allowable maximum value Bmax, on the contrary, the structure of the second embodiment enables the vehicle to fall in the free running state while consuming the electric power of the battery 94.

The power output apparatus 20 of the first embodiment can go into still another application given as a third embodiment of the present invention. In the first and the second embodiments, the vehicle is set into a free running state while being driven under the normal driving condition (that is, when the drive shaft 22 is rotated at a lower revolving speed than that of the crankshaft 56 of the gasoline engine 50) or while being driven under the overdrive condition (that is, when the drive shaft 22 is rotated at a higher revolving speed than that of the crankshaft 56 of the gasoline engine 50). As a special case, it is also possible to make the vehicle come into the free running state when the revolving speed of the drive shaft 22 is identical with that of the crankshaft 56 of the gasoline engine 50.

The following describes the operation in this special case. By way of example, it is assumed that the gasoline engine 50 driven by the EFIECU 70 rotates at a predetermined revolving speed Ne and that the drive shaft 22 rotates in the direction of rotation of the crankshaft 56 at a revolving speed Nd approximately equal to the predetermined revolving speed Ne (Nd≈Ne).

In the same manner as the first and the second embodiments, the control CPU 90 of the controller 80 refers to the output data of the residual capacity meter 99, and determines whether the residual capacity BRM of the battery 94 is less than the allowable minimum value Bmin or greater than the allowable maximum value Bmax to be out of the allowable range or alternatively not less than the allowable minimum value Bmin and not greater than the allowable maximum value Bmax to be within the allowable range.

When the residual capacity BRM of the battery 94 is smaller than the allowable minimum value Bmin and thus determined to be out of the allowable range, the power output apparatus 20 is set into a sixth arrangement of operation. In the sixth arrangement of operation, the control CPU 90 of the controller 80 controls the first driving circuit 91 to fix the crankshaft 56 integrally with the drive shaft 22 through the electromagnetic coupling of the outer rotor 32 with the inner rotor 34 in the clutch motor 30. The state of fixing the crankshaft 56 and the drive shaft 22 integrally with each other is hereinafter referred to as the lock-up state. This is realized by enabling the three-phase coils 36 of the clutch motor 30 to generate not a revolving magnetic field but a stationary magnetic field. This makes the drive shaft 22 rotate integrally with the crankshaft 56 at an identical revolving speed. The control CPU 90 then controls the second driving circuit 92 to enable the assist motor 40 to carry out the regenerative operation and regenerate electric power via the second driving circuit 92. The electric power regenerated by the assist motor 40 is supplied to the battery 94 to supplement the electric power of the battery 94. Part of the regenerated electric power is used to maintain the lock-up state of the clutch motor 30.

Figure 22:
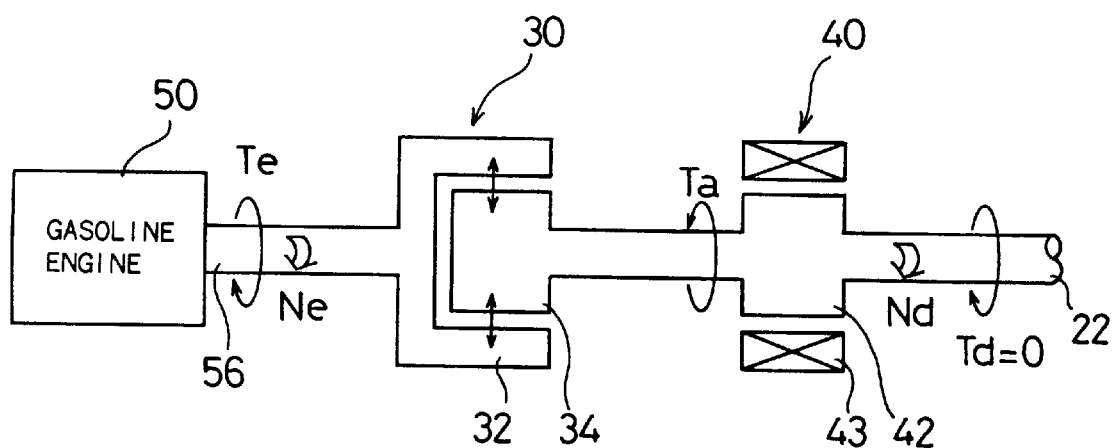
FIG. 22 shows torques applied to the drive shaft 22 and the crankshaft 56 of the power output apparatus 20 in a sixth arrangement of operation as a third embodiment according to the present invention.

FIG. 22 shows torques applied to the drive shaft 22 and the crankshaft 56 of the power output apparatus 20 in the sixth arrangement of operation. By way of example, it is assumed that the crankshaft 56 and the drive shaft 22 are rotated at an identical revolving speed (Ne=Nd) in the direction defined by the open arrow of FIG. 22. The crankshaft 56 receives a torque Te produced by the gasoline engine 50 in the direction of rotation of the crankshaft 56. When the assist motor 40 is controlled to carry out the regenerative operation, the drive shaft 22 receives a torque Ta produced by the assist motor 40 in the reverse of the rotation of the drive shaft 22. When the clutch motor 30 is kept in the lock-up state, the crankshaft 56 and the drive shaft 22 are fixed integrally with each other. On the stationary axis consisting of the crankshaft 56 and the drive shaft 22, the torque Te produced by the gasoline engine 50 is opposite in direction to the torque Ta produced by the assist motor 40. Provided that the magnitude of the torque Te is identical with that of the torque Ta, the torques Te and Ta cancel each other on the drive shaft 22. The output torque Td of the drive shaft 22 thus becomes substantially equal to zero, so that the vehicle is set into the free running state.

When the residual capacity BRM of the battery 94 is greater than the allowable maximum value Bmax and thus determined to be out of the allowable range, on the other hand, the power output apparatus 20 is set into a seventh arrangement of operation. In the seventh arrangement of operation, the control CPU 90 of the controller 80 controls the first driving circuit 91 to lock up the clutch motor 30. The electric power required for maintaining the lock-up state of the clutch motor 30 is supplied from the battery 94. The control CPu 90 then controls the second driving circuit 92 to enable the assist motor 40 to carry out the power operation with the electric power stored in the battery 94. Like the second and the fifth arrangements of operation described above, the control CPU 90 sends an instruction to the EFIECU 70, which then controls the gasoline engine 50 to be set in an idling state in order to attain an effect of engine brake in the seventh arrangement of operation. In accordance with another preferred structure, the fuel injection may be stopped to cease the operation of the gasoline engine 50.

Figure 23:
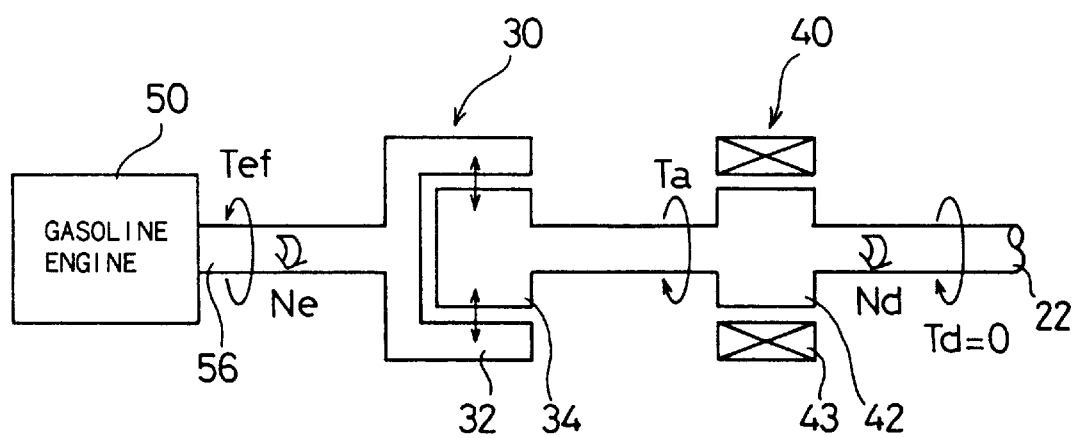
FIG. 23 shows torques applied to the drive shaft 22 and the crankshaft 56 of the power output apparatus 20 in a seventh arrangement of operation.

FIG. 23 shows torques applied to the drive shaft 22 and the crankshaft 56 of the power output apparatus 20 in the seventh arrangement of operation. By way of example, it is assumed that the crankshaft 56 and the drive shaft 22 are rotated at an identical revolving speed (Ne=Nd) in the direction defined by the open arrow of FIG. 23. When the assist motor 40 is controlled to carry out the power operation, the drive shaft 22 receives a torque Ta produced by the assist motor 40 in the direction of rotation of the drive shaft 22. When the clutch motor 30 is kept in the lock-up state, the crankshaft 56 and the drive shaft 22 are fixed integrally with each other. Since the torque Ta of the assist motor 40 acts to enhance the rotation of the crankshaft 56, the gasoline engine 50 exerts an effect of engine brake. The crankshaft 56 accordingly receives a friction torque Tef produced by the gasoline engine 50, which is equal in magnitude but opposite in direction to the torque Ta. On the stationary axis consisting of the crankshaft 56 and the drive shaft 22, the torque Ta produced by the assist motor 40 is opposite in direction to the friction torque Tef produced by the gasoline engine 50. The torques Ta and Tef accordingly cancel each other on the drive shaft 22. The output torque Td of the drive shaft 22 thus becomes substantially equal to zero, so that the vehicle is set into the free running state.

When the residual capacity BRM of the battery 94 is determined to be within the allowable range, the power output apparatus 20 is set into the third arrangement of operation in the same manner as described above.

In the third embodiment, when the drive shaft 22 is rotated at a revolving speed identical with that of the crankshaft 56 of the gasoline engine 50, the above control processes make the torque output to the drive shaft 22 substantially equal to zero, thereby realizing a free running state of the vehicle. When the residual capacity BRM of the battery 94 is less than the allowable minimum value Bmin, the structure of the third embodiment enables the vehicle to fall in the free running state while supplementing the electric power of the battery 94. When the residual capacity BRM of the battery 94 is greater than the allowable maximum value Bmax, on the contrary, the structure of the third embodiment enables the vehicle to fall in the free running state while consuming the electric power of the battery 94.

FIG. 24 tabulates the first through the seventh arrangements of operation described in the first through the third embodiments.

In one example, when the revolving speed Nd of the drive shaft 22 is lower than the revolving speed Ne of the crankshaft 56 of the gasoline engine 50 (engine speed) and the residual capacity BRM of the battery 94 is less than the allowable minimum value Bmin, the power output apparatus 20 falls in the first arrangement of operation. In the first arrangement of operation, the gasoline engine 50 is controlled to drive the crankshaft 56, while both the clutch motor 30 and the assist motor 40 are controlled to implement the regenerative operation.

In another example, when the revolving speed Nd of the drive shaft 22 is higher than the revolving speed Ne of the crankshaft 56 of the gasoline engine 50 and the residual capacity BRM of the battery 94 is greater than the allowable maximum value Bmax, the power output apparatus 20 falls in the fifth arrangement of operation. In the fifth arrangement of operation, the gasoline engine 50 is controlled to brake the crankshaft 56, which has been activated by an external force. The clutch motor 30 is controlled to implement the regenerative operation, whereas the assist motor 40 is controlled to implement the power operation.

The appropriate arrangement of operation is selected among the seven alternatives based on the revolving speeds of the crankshaft 56 and the drive shaft 22 and the residual capacity of the battery 94. Operations of the gasoline engine 50, the clutch motor 30, and the assist motor 40 are then controlled according to the selected arrangement of operation.

There may be many other modifications, alternations, and changes without departing from the scope or spirit of essential characteristics of the invention. It is thus clearly understood that the above embodiments are only illustrative and not restrictive in any sense. Some examples of modification are given below.

In the structure of the power output apparatus 20 shown in FIG. 1, the clutch motor 30 and the assist motor 40 are separately attached to the different positions of the drive shaft 22. Like a modified power output apparatus 20A illustrated in FIG. 25, however, the clutch motor and the assist motor may be joined integrally with each other. A clutch motor 30A of the power output apparatus 20A includes an inner rotor 34 connecting with the crankshaft 56 and an outer rotor 32A linked with the drive shaft 22. Three-phase coils 36 are attached to the inner rotor 34, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36 are mounted on the inner rotor 34 connecting with the crankshaft 56, a rotary transformer 38 for supplying power to the three-phase coils 36 of the clutch motor 30A is attached to the crankshaft 56.

In the power output apparatus 20A, the voltage applied to the three-phase coils 36 on the inner rotor 34 is controlled against the inner-surface magnetic pole of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power output apparatus 20. The control procedures discussed as the first through the third embodiments above are applicable to the power output apparatus 20A shown in FIG. 25, which accordingly exerts the same effects as those of the power output apparatus 20 shown in FIG. 1.

Figure 25:
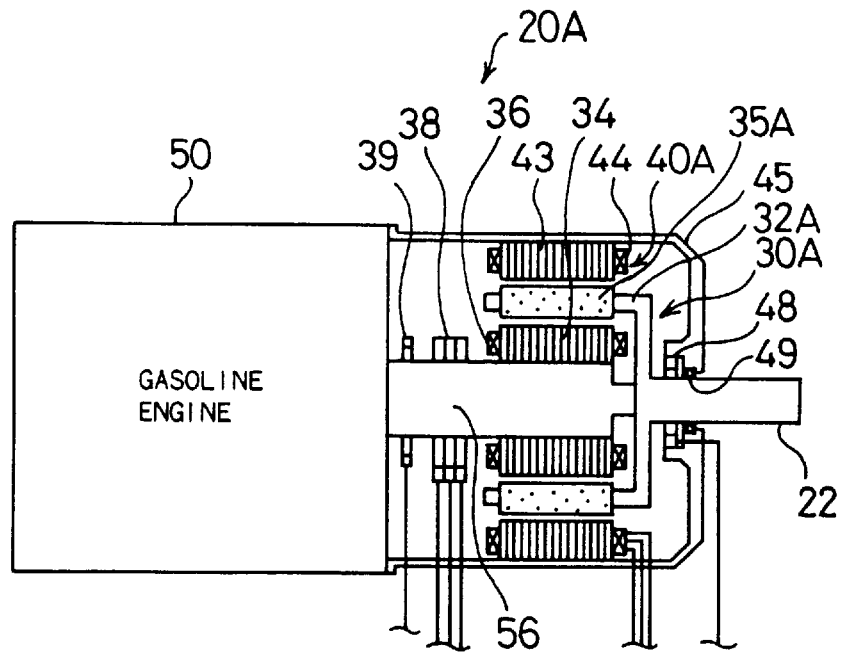
FIG. 25 is a schematic view illustrating an essential part of another power output apparatus 20A as a modification of the invention.

In the power output apparatus 20A of FIG. 25, the clutch motor 30A and the assist motor 40A are integrally joined with each other, which shortens the length of the power output apparatus 20A along the drive shaft 22. The outer rotor 32A functions concurrently as one of the rotors in the clutch motor 30A and as the rotor of the assist motor 40A, thereby effectively reducing the size and weight of the whole power output apparatus 20A.

The modified structure that the outer rotor 32A works as one of the rotors in the clutch motor 30A and as the rotor of the assist motor 40A causes the clutch motor 30A and the assist motor 40A to magnetically interfere with each other and thereby have adverse effects on each other. In order to prevent the large magnetic interference, the outer rotor 32A may be constructed as a double-cylinder structure including two concentric cylinders. One of the cylinders is assigned to the rotor of the clutch motor 30A, and the other to the rotor of the assist motor 40A. The two cylinders apart from each other by a predetermined distance are connected to the drive shaft 22. A magnetic shielding member for blocking the magnetic lines of force is also effective for preventing the magnetic interference.

Figure 26:
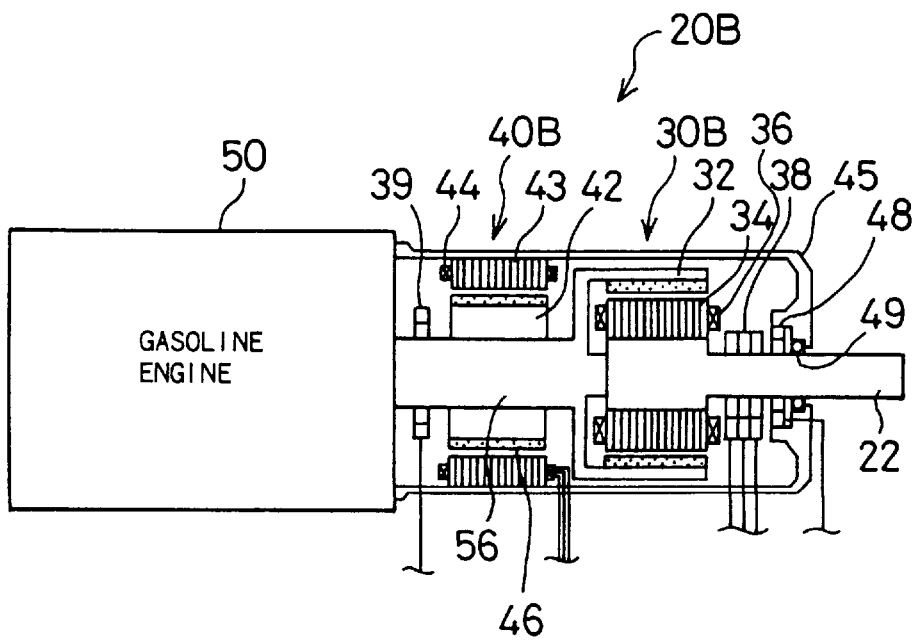
FIG. 26 is a schematic view illustrating an essential part of still another power output apparatus 20B as another modification of the invention.

Although the assist motor 40 is attached to the drive shaft 22 in the power output apparatus 20 of FIG. 1, an assist motor 40B may be attached to the crankshaft 56 of the gasoline engine 50 like another power output apparatus 20B shown in FIG. 26.

The power output apparatus 20B of FIG. 26 has a similar structure to that of the power output apparatus 20 of FIG. 1, except that the assist motor 40B is attached to the crankshaft 56 placed between the gasoline engine 50 and a clutch motor 30B. In the power output apparatus 20B of FIG. 26, like elements as those of the power output apparatus 20 of FIG. 1 are shown by like numerals or symbols and are not explained here. The symbols used in the above description have like meanings unless otherwise specified.

The following describes operation of the power output apparatus 20B shown in FIG. 26. By way of example, it is assumed that the gasoline engine 50 is driven with a torque Te and at a revolving speed Ne. When a torque Ta is added to the crankshaft 56 by the assist motor 40B linked with the crankshaft 56, the sum of the torques (Te+Ta) consequently acts on the crankshaft 56. When the clutch motor 30B is controlled to produce the torque Tc equal to the sum of the torques (Te+Ta), the torque Tc (=Te+Ta) is eventually transmitted from the clutch motor 30B to the drive shaft 22.

When the vehicle is driven in a normal driving state, that is, when the revolving speed Nd of the drive shaft 22 is lower than the revolving speed Ne of the gasoline engine 50 (Nd<Ne), the clutch motor 30B regenerates electric power based on the revolving speed difference Nc between the revolving speed Ne of the gasoline engine 50 and the revolving speed Nd of the drive shaft 22. The regenerated power is supplied to the assist motor 40B via the first and the second driving circuits 91 and 92 to activate the assist motor 40B. Provided that the torque Ta of the assist motor 40B is set to a value, which enables the assist motor 40B to consume the electrical energy substantially equivalent to the electrical energy regenerated by the clutch motor 30B, free torque conversion is allowed for the energy output from the gasoline engine 50 within a range holding the relationship of Equation (5) given below. Since the relationship of Equation (5) represents the ideal state with an efficiency of 100%, (Tc×Nd) is a little smaller than (Te×Ne) in the actual state:

$$Te \times Ne = Tc \times Nd \quad (5)$$

When the vehicle runs, for example, an expressway at a high speed, that is, when the revolving speed Nd of the drive shaft 22 is higher than the revolving speed Ne of the gasoline engine 50 (Nd>Ne), the clutch motor 30B works as a normal motor. The clutch motor 30B accordingly enhances the speed of rotation of the inner rotor 34 relative to the outer rotor 32. Provided that the torque Ta of the assist motor 40B is set to a negative value, which enables the assist motor 40B to regenerate the electrical energy substantially equivalent to the electrical energy consumed by the clutch motor 30B, free torque conversion is also allowed for the energy output from the gasoline engine 50 within a range holding the relationship of Equation (5) given above.

The power output apparatus 20B of this modified structure can also set the vehicle in a free running state as described below.

By way of example, it is assumed that the gasoline engine 50 driven by the EFIECU 70 rotates at a predetermined revolving speed Ne, while the drive shaft 22 is rotated in the direction of rotation of the crankshaft 56 at a predetermined revolving speed Nd. The revolving speed Nd of the drive shaft 22 may be smaller than (corresponding to the normal driving state), greater than (corresponding to the high-speed driving state), or equal to the revolving speed Ne of the crankshaft 56.

In the same manner as the first through the third embodiments described above, the control CPU 90 of the controller 80 of the power output apparatus 20B refers to the output data of the residual capacity meter 99, and determines whether the residual capacity BRM of the battery 94 is less than the allowable minimum value Bmin or greater than the allowable maximum value Bmax to be out of the allowable range or alternatively not less than the allowable minimum value Bmin and not greater than the allowable maximum value Bmax to be within the allowable range.

When the residual capacity BRM of the battery 94 is smaller than the allowable minimum value Bmin and thus determined to be out of the allowable range, the control CPU 90 controls the first driving circuit 91 to prevent an electric current from flowing through the three-phase coils 36 of the clutch motor 30B. This substantially disconnects the electromagnetic coupling of the outer rotor 32 with the inner rotor 34 in the clutch motor 30B. The drive shaft 22 is thus completely disconnected and free from the crankshaft 56. The control CPU 90 then controls the second driving circuit 92 to enable the assist motor 40B to carry out the regenerative operation and regenerate electric power via the second driving circuit 92. The electric power regenerated by the assist motor 40B is supplied to the battery 94 to supplement the electric power of the battery 94.

Figure 27:
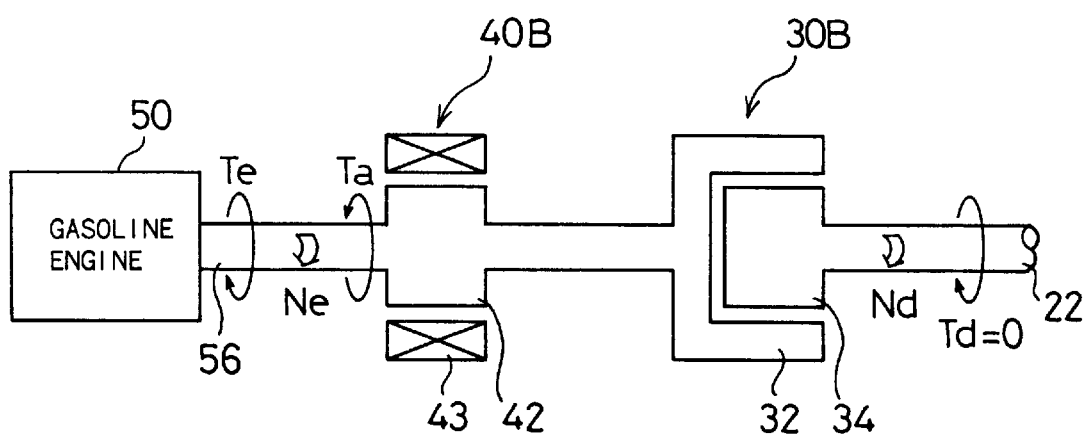
FIG. 27 shows torques applied to the drive shaft 22 and the crankshaft 56 of the power output apparatus 20B of FIG. 26.

FIG. 27 shows torques applied to the drive shaft 22 and the crankshaft 56 of the power output apparatus 20B. By way of example, it is assumed that the crankshaft 56 and the drive shaft 22 are rotated respectively at predetermined revolving speeds Ne and Nd in the direction defined by the open arrow of FIG. 27. Since the electromagnetic coupling of the outer rotor 32 with the inner rotor 34 is disconnected in the clutch motor 30B, the clutch motor 30B does not apply any torque to the drive shaft 22. This makes the output torque Td of the drive shaft 22 substantially equal to zero, thereby realizing a free running state of the vehicle. The clutch motor 30B does not apply any torque to the crankshaft 56, either. The crankshaft 56, however, receives a torque Te produced by the gasoline engine 50 in the direction of rotation of the crankshaft 56 as well as a torque Ta produced by the assist motor 40B, which implements the regenerative operation, in the reverse of the rotation of the crankshaft 56. When the revolving speed Ne of the crankshaft 56 is substantially constant in a stationary state, the torques Te and Ta are approximately equal in magnitude to each other and thereby balance with each other.

When the residual capacity BRM of the battery 94 is greater than the allowable maximum value Bmax and thus determined to be out of the allowable range, on the other hand, the control CPU 90 controls the first driving circuit 91 to prevent an electric current from flowing through the three-phase coils 36 of the clutch motor 30B. This substantially disconnects the electromagnetic coupling of the outer rotor 32 with the inner rotor 34 in the clutch motor 30B. The control CPU 90 then controls the second driving circuit 92 to enable the assist motor 40B to carry out the power operation with the electric power stored in the battery 94. The control CPU 90 sends an instruction to the EFIECU 70, which then controls the gasoline engine 50 to be set in an idling state in order to attain an effect of engine brake. In accordance with another preferred structure, the fuel injection may be stopped to cease the operation of the gasoline engine 50.

Figure 28:
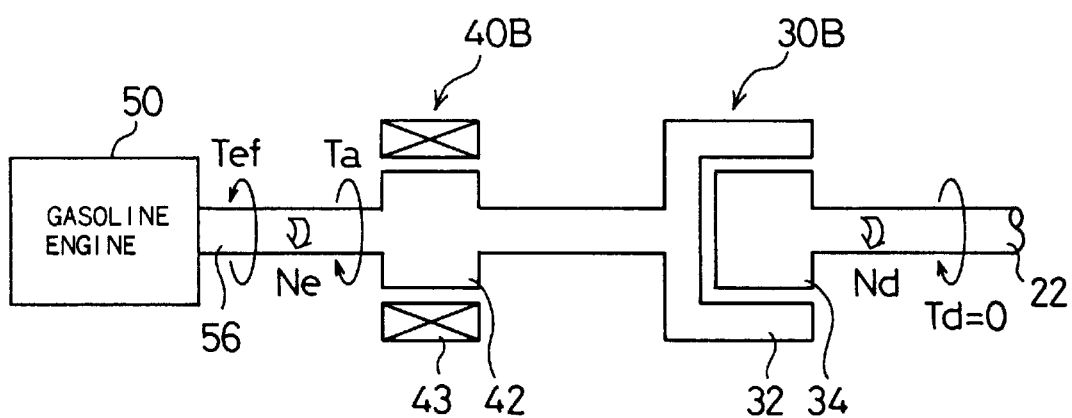
FIG. 28 shows torques applied to the drive shaft 22 and the crankshaft 56 of the power output apparatus 20B of FIG. 26.

FIG. 28 shows torques applied to the drive shaft 22 and the crankshaft 56 of the power output apparatus 20B. By way of example, it is assumed that the crankshaft 56 and the drive shaft 22 are rotated respectively at predetermined revolving speeds Ne and Nd in the direction defined by the open arrow of FIG. 28. Since the electromagnetic coupling of the outer rotor 32 with the inner rotor 34 is disconnected in the clutch motor 30B, the clutch motor 30B does not apply any torque to the drive shaft 22. This makes the output torque Td of the drive shaft 22 substantially equal to zero, thereby realizing a free running state of the vehicle. The clutch motor 30B does not apply any torque to the crankshaft 56, either. The crankshaft 56, however, receives a torque Ta produced by the assist motor 40B, which implements the power operation, in the direction of rotation of the crankshaft 56. Since the torque Ta of the assist motor 40B acts to enhance the rotation of the crankshaft 56, the gasoline engine 50 exerts an effect of engine brake. The crankshaft 56 accordingly receives a friction torque Tef produced by the gasoline engine 50, which is equal in magnitude but opposite in direction to the torque Ta.

When the residual capacity BRM of the battery 94 is determined to be within the allowable range, the power output apparatus 20B is set into the third arrangement of operation, which is described for the first embodiment.

In the above control procedure, it is not required to completely cut off the electromagnetic coupling of the outer rotor 32 with the inner rotor 34, as long as practical disconnection is attained. In this state, a weak electric current may flow through the three-phase coils 36 of the clutch motor 30B to maintain a weak coupling, as long as substantially no torques are produced by the clutch motor 30B.

The power output apparatus 20B shown in FIG. 26 can also make the torque output to the drive shaft 22 substantially equal to zero, thereby realizing a free running state of the vehicle. When the residual capacity BRM of the battery 94 is less than the allowable minimum value Bmin, the structure of the power output apparatus 20B enables the vehicle to fall in the free running state while supplementing the electric power of the battery 94. When the residual capacity BRM of the battery 94 is greater than the allowable maximum value Bmax, on the contrary, the structure of the power output apparatus 20B enables the vehicle to fall in the free running state while consuming the electric power of the battery 94.

Figure 29:
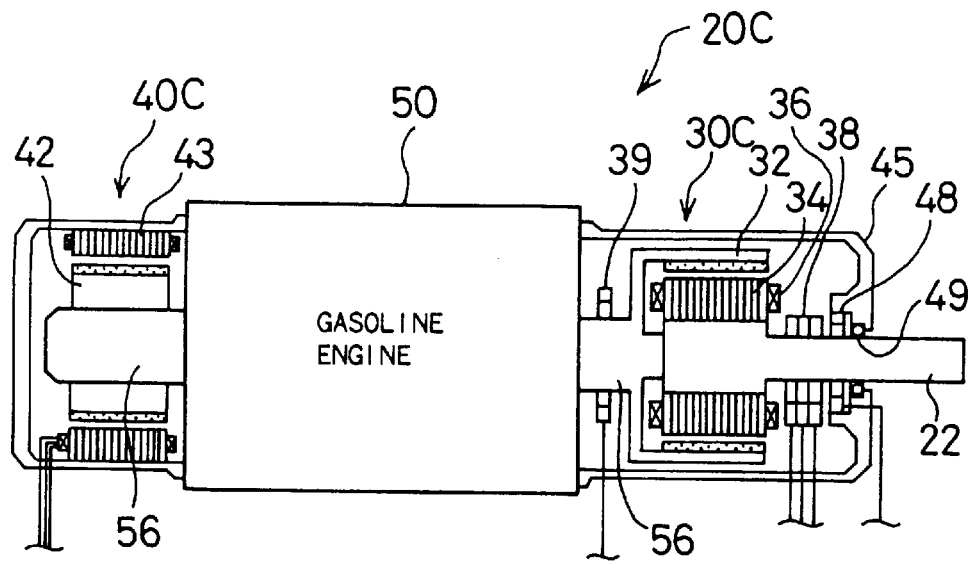
FIG. 29 is a schematic view illustrating an essential part of another power output apparatus 20C as still another modification of the invention.

In the power output apparatus 20B of FIG. 26, the assist motor 40B is attached to the crankshaft 56 placed between the gasoline engine 50 and the clutch motor 30B. Like another power output apparatus 20C illustrated in FIG. 29, however, the gasoline engine 50 may be interposed between a clutch motor 30C and an assist motor 40C attached to the crankshaft 56. The control procedures executed by the power output apparatus 20B of FIG. 26 are also applicable to the power output apparatus 20C, which accordingly realizes the same operations and effects.

In the power output apparatus 20B of FIG. 26, the clutch motor 30B and the assist motor 40B are separately attached to the different positions of the crankshaft 56. Like a power output apparatus 20D shown in FIG. 30, however, a clutch motor 30D and an assist motor 40D may be joined integrally with each other. The clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. The assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30B of the power output apparatus 20B shown in FIG. 26. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40B of the power output apparatus 20B. The control procedures of the first through the third embodiments discussed above are also applicable to the power output apparatus 20D shown in FIG. 30, which accordingly exerts the same effects as those of the power output apparatus 20B shown in FIG. 26.

Figure 30:
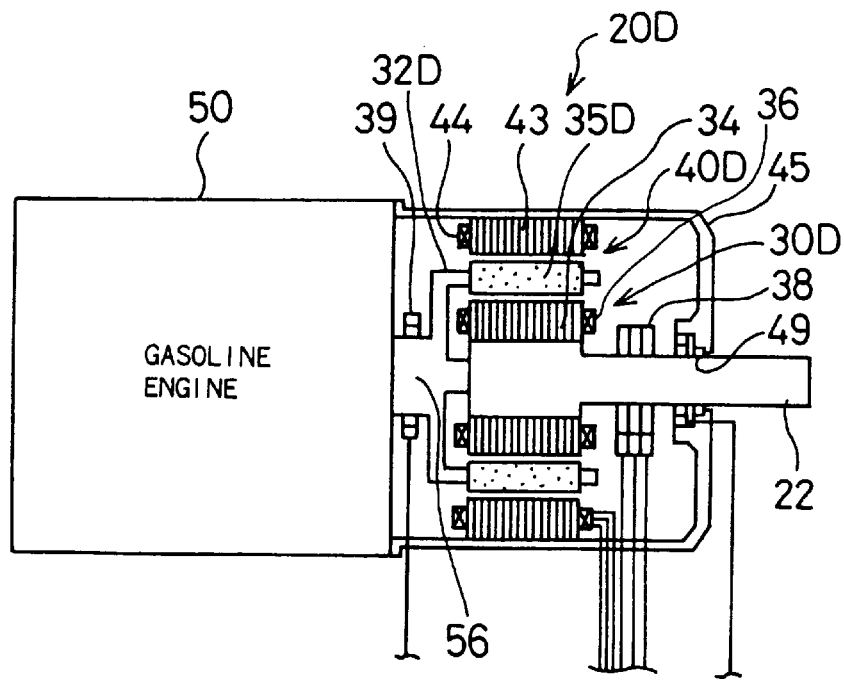
FIG. 30 is a schematic view illustrating an essential part of still another power output apparatus 20D as another modification of the invention.

Like the power output apparatus 20A of FIG. 25, in the power output apparatus 20D of FIG. 30, the clutch motor 30D and the assist motor 40D are integrally joined with each other, which shortens the length of the power output apparatus 20D along the drive shaft 22. The outer rotor 32D functions concurrently as one of the rotors in the clutch motor 30D and as the rotor of the assist motor 40D, thereby effectively reducing the size and weight of the whole power output apparatus 20D.

In all the structures of FIGS. 1, 25, 26, 29, and 30, the power output apparatus includes the assist motor 40 as well as the clutch motor 30. The free running state of the vehicle may, however, be realized by the structure of FIG. 1 without the assist motor 40. In this modified structure without the assist motor 40, when no electric current is made to flow through the three-phase coils 36 of the clutch motor 30, the electromagnetic coupling of the outer rotor 32 with the inner rotor 34 is substantially disconnected in the clutch motor 30. The drive shaft 22 is thus completely disconnected and free from the crankshaft 56. The clutch motor 30 accordingly does not apply any torque to the drive shaft 22. This makes the output torque Td of the drive shaft 22 substantially equal to zero, thereby realizing a free running state of the vehicle. In this case, the gasoline engine 50 may be stopped or kept at an idle.

Figure 31:
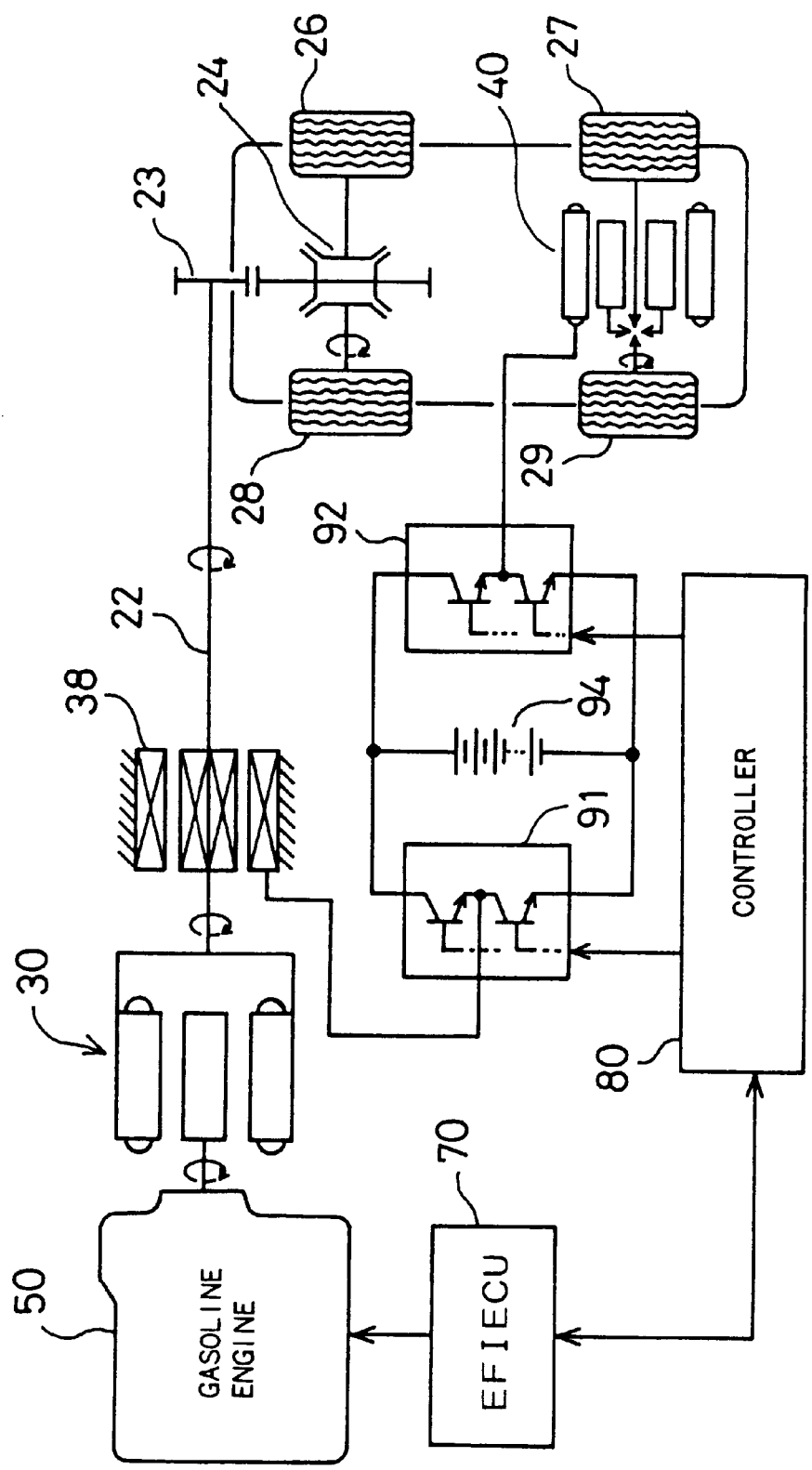
FIG. 31 shows application of the power output apparatus 20 of FIG. 1 to a vehicle with a four-wheel drive.

The power output apparatus 20 of FIG. 1 is also applicable to the vehicle with a four-wheel drive (4WD) as shown in FIG. 31. In the structure of FIG. 31, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. In this structure, the front driving wheels 26 and 28 are connected with the rear driving wheels 27 and 29 via the road surface, so that the drive shaft 22 is practically coupled with the assist motor 40 in the rear-wheel portion.

This modified structure also applies one of the first through the seventh arrangements of operation described previously (see FIG. 24) to realize a free running state of the vehicle. In the first, second, fourth, or fifth arrangement of operation, for example, either the regenerative operation or the power operation of the clutch motor 30 and the assist motor 40 allows torques to be respectively applied to the front driving wheels 26 and 28 and the rear driving wheels 27 and 29. The torque on the front-wheel portion and that on the rear-wheel portion are approximately equal in magnitude but opposite in direction to each other and cancel each other via the road surface, thereby realizing a free running state of the vehicle. In the third arrangement of operation, the clutch motor 30 and the assist motor 40 are controlled to stop working. Both the torque applied from the clutch motor 30 to the front driving wheels 26 and 28 and the torque applied from the assist motor 40 to the rear driving wheels 27 and 29 thus become substantially equal to zero. This enables the vehicle to be set in the free running state. In the sixth or seventh arrangement of operation, the clutch motor 30 is locked up while the assist motor 40 is controlled to implement either the regenerative operation or the power operation. This allows torques to be respectively applied to the front driving wheels 26 and 28 and the rear driving wheels 27 and 29. The torque on the front-wheel portion and that on the rear-wheel portion are approximately equal in magnitude but opposite in direction to each other and cancel each other via the road surface, thereby realizing a free running state of the vehicle.

In the embodiments discussed above, when the residual capacity BRM of the battery 94 is within the allowable range, the power output apparatus is set into the third arrangement of operation, in which both the clutch motor 30 and the assist motor 40 are controlled to stop operation and the battery 94 is kept in the current state without any supplement or consumption of electric power. As long as the residual capacity BRM of the battery 94 is within the allowable range, the clutch motor 30 or the assist motor 40 may be controlled to implement either the power operation or the regenerative operation to consume or supplement the electric power of the battery 94. In the second, fifth, or seventh arrangement of operation, the gasoline engine 50 is controlled to exert an effect of engine brake. A braking mechanism, such as a mechanical brake, may, however, be used in place of the gasoline engine 50.

In the above embodiments, no auxiliary machines (for example, a cooling a pump, a power steering pump, and a compressor for an air conditioner) or other torque-producing machines are connected with the crankshaft 56 or the drive shaft 22. When any torque-producing machine is attached to the crankshaft 56 or the drive shaft 22, it is required to control the gasoline engine 50, the clutch motor 30, and the assist motor 40 by taking into account the torques applied from the torque-producing machine to the crankshaft 56 and the drive shaft 22, in order to make the torque output to the drive shaft 22 substantially equal to zero.

In the above embodiments, the electric power regenerated by the clutch motor 30 or the assist motor 40 is stored into the battery 94. In accordance with one preferred structure, the regenerated electric power is not stored into the battery 94 but is consumed by a variety of electrical equipment (for example, lighting facilities, sound facilities, and cooling facilities) mounted on the vehicle. In accordance with another preferred structure, the regenerated electric power is partly stored into the battery 94 while the remaining part being consumed by a variety of electrical equipment. In the embodiments discussed above, one or both of the clutch motor 30 and the assist motor 40 carry out the power operation with either or both of the electric power supplied from the battery 94 and the electric power regenerated by the other motor. Electric power generated by another generator means may, however, be used for the power operation.

In the above embodiments, the outer rotor 32 of the clutch motor 30 is directly linked with the crankshaft 56, the inner rotor 34 of the clutch motor 30 with the drive shaft 22, and the rotor 42 of the assist motor 40 with either the drive shaft 22 or the crankshaft 56. The connection may, however, be attained via any coupling means, such as a gear or a belt.

The gasoline engine 50 driven by means of gasoline is used as the engine in the above embodiments. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, and superconducting motors may be used for both the regenerative operation and power operation, while stepping motors are applicable only for the power operation.

In the above embodiments discussed above, the outer rotor 32 of the clutch motor 30 is linked with the crankshaft 56, whereas the inner rotor 34 is connected to the drive shaft 22. Alternatively, the outer rotor 32 may be linked with the drive shaft 22 and the inner rotor 34 with the crankshaft 56. Disk rotors facing each other may be used instead of the outer rotor 32 and the inner rotor 34.

The rotary transformer 38 used as means for transmitting electric power to the clutch motor 30 may be replaced by a slip ring-bush contact, a slip ring-mercury contact, a semiconductor coupling of magnetic energy, or the like.

In the above power output apparatuses, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus comprising:

an output shaft for connection to an output of an engine;

a drive shaft for connection to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors, said first motor applying a first torque to said drive shaft;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor, said second motor applying a second torque to said drive shaft;

a second motor-driving circuit that exchanges electric currents with said second motor to vary the electromagnetic coupling of said stator with said third rotor;

a storage device that stores electric power;

a residual capacity measuring device that measures a residual capacity of electric power stored in said storage device; and a controller that sends signals to said first and second motor-driving circuits such that said first motor-driving circuit enables said first motor to regenerate electric power and said second motor-driving circuit enables said second motor to regenerate electric power, with at least part of said regenerated electric power being stored in said storage device, and said controller causes said first motor-driving circuit to cause said first motor to apply said first torque in a direction of rotation of said drive shaft and said second motor-driving circuit causes said second motor to apply said second torque in an opposite direction from said first torque and at approximately the same magnitude as said first torque, when the residual capacity measured by the residual capacity measuring device is less than a predetermined value.

2. The power output apparatus in accordance with claim 1, wherein said third rotor is mounted on said second rotor connected with said drive shaft.

3. A power output apparatus comprising:
an output shaft for connection to an output of an engine;
a drive shaft for connection to a load;
a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors, said first motor applying a first torque to said drive shaft;
a first motor-driving circuit that exchanges electric currents with said first motor to vary the electromagnetic coupling of said first rotor with said second rotor;
a second motor comprising a stator and a third rotor connected with said drive shaft, said stator being electromagnetically coupled with said third rotor, said second motor applying a second torque to said drive shaft;
a second motor-driving circuit that exchanges electric currents with said second motor to vary the electromagnetic coupling of said stator with said third rotor;
a storage device that stores electric power;
a residual capacity measuring device that measures a residual capacity of electric power stored in said storage device; and
a controller that sends signals to said first and second motor-driving circuits to control said first motor-driving circuit to supply the electric power stored in said storage device to said first motor in order to activate said first motor, and to control said second motor-driving circuit to supply the electric power stored in said storage device to said second motor in order to activate said second motor and said controller causes said first motor-driving circuit to cause said first motor to apply said first torque in a direction opposite to a direction of rotation of said drive shaft and said second motor-driving circuit causes said second motor to apply said second torque in the direction of rotation of the drive shaft and with approximately the same magnitude as the first torque, when the residual capacity measured by said residual capacity measuring device is greater than a predetermined value.

4. The power output apparatus in accordance with claim 3, wherein said third rotor is mounted on said second rotor connected with said drive shaft.

5. A power output apparatus comprising:
an output shaft for receiving power from an engine;
a drive shaft for transmitting power to a load;
a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors, said first motor applying a first torque to said drive shaft;
a first motor-driving circuit that exchanges electric currents with said first motor to vary the electromagnetic coupling of said first rotor with said second rotor;
a second motor comprising a stator and third rotor connected with said drive shaft, said stator being electromagnetically coupled with said third rotor, said second motor applying a second torque to said drive shaft;
a second motor-driving circuit that exchanges electric currents with said second motor to vary the electromagnetic coupling of said stator with said third rotor;
a storage device that stores electric power;
a residual capacity measuring device that measures a residual capacity of electric power stored in said storage device; and
a controller that sends signals to said first and second motor-driving circuits to cause said second motor-driving circuit to enable said second motor to regenerate electric power, and to cause said first motor-driving circuit to supply the regenerated electric power to said first motor in order to activate said first motor and with at least part of said regenerated electric power being stored in said storage device and said controller causes said first motor-driving circuit to cause said first motor to apply said first torque in a direction of rotation of said drive shaft and said second motor-driving circuit causes said second motor to apply said second torque in an opposite direction from said first torque with approximately the same magnitude as said first torque, when said residual capacity is less than a predetermined value.

6. The power output apparatus in accordance with claim 5, wherein said third rotor is mounted on said second rotor connected with said drive shaft.

7. A power output apparatus comprising:
an output shaft for receiving power from an engine;
a drive shaft for transmitting power to a load;
a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft of said engine and said drive shaft via the electromagnetic coupling of said first and second rotors, said first motor applying a first torque to said drive shaft;
a first motor-driving circuit that exchanges electric currents with said first motor to vary the electromagnetic coupling of said first rotor with said second rotor;
a second motor comprising a stator and a third rotor connected with said drive shaft, said stator being electromagnetically coupled with said third rotor, said second motor applying a second torque to said drive shaft;
a second motor-driving circuit that exchanges electric currents with said second motor to vary the electromagnetic coupling of said stator with said third rotor;
a storage device that stores electric power;
a residual capacity measuring device that measures a residual capacity of electric power stored in said storage device; and a controller that sends signals to said first and second motor-driving circuits to cause said first motor-driving circuit to enable said first motor to regenerate electric power and to cause said second motor-driving circuit to supply the regenerated electric power and the electric power stored in said storage device to said second motor in order to activate said second motor, and when said residual capacity is greater than a predetermined value, said controller causes said first motor-driving circuit to cause said first motor to apply said first torque in a direction opposite to a direction of rotation of said drive shaft and said second motor-driving circuit causes said second motor to apply said second torque in the direction of rotation of the drive shaft and at approximately the same magnitude as the first torque.

8. The power output apparatus in accordance with claim 7, wherein said third rotor is mounted on said second rotor connected with said drive shaft.

9. A power output apparatus comprising:

an output shaft for receiving a first torque from an engine;

a drive shaft for transmitting power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and third rotor connected with said drive shaft, said stator being electromagnetically coupled with said third rotor, said second motor applying a second torque to said drive shaft;

a second motor-driving circuit that exchanges electric currents with said second motor to vary the electromagnetic coupling of said stator with said third rotor;

a storage device for storing electric power;

a residual capacity measuring device for measuring a residual capacity of electric power stored in said storage device; and a controller that sends signals to said first and second motor-driving circuits to cause said first motor-driving circuit to electromagnetically lock up said first rotor relative to said second rotor of said first motor so that said output shaft rotates integrally with said drive shaft, controlling said second motor-driving circuit to enable said second motor to regenerate electric power with at least part of said regenerated electric power being stored in said storage device and said controller causes said second motor-driving circuit to cause said second motor to apply said second torque to said drive shaft in a direction opposite to a direction of rotation of said drive shaft and with approximately the same magnitude as said first torque, when said residual capacity is less than a predetermined value.

10. A power output apparatus comprising:

an output shaft for receiving power from an engine;

a drive shaft for transmitting power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device for storing electric power;

a residual capacity measuring device that measures a residual capacity of electric power stored in said storage device; and a controller that sends signals to said first and second motor-driving circuits to cause said first motor-driving circuit to electromagnetically lock up said first rotor relative to said second rotor of said first motor so that said output shaft rotates integrally with said drive shaft and said controller causes said second motor-driving circuit to supply electric power stored in said storage device to said second motor such that said second motor applies a torque to said drive shaft in a direction of rotation of said drive shaft, when said residual capacity is greater than a predetermined value.

11. A power output apparatus comprising:

an output shaft for receiving power from an engine;

a drive shaft for transmitting power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor;

a storage device that stores electric power;

a residual capacity measuring device that measures a residual capacity of electric power stored in said storage device; and a controller that sends signals to said first and second motor-driving circuits to cause said first motor-driving circuit to substantially disconnect the electromagnetic coupling of said first rotor with said second rotor in said first motor, and controlling said second motor-driving circuit to enable said second motor to regenerate electric power with at least part of said regenerated electric power being stored in said storage device, when said residual capacity is less than a predetermined value.

12. The power output apparatus in accordance with claim 11, wherein said third rotor is mounted on said first rotor connected with said output shaft.

13. A power output apparatus comprising:

an output shaft for receiving power from an engine;

a drive shaft for transmitting power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor;

a storage device that stores electric power;

a residual capacity measuring device that measures a residual capacity of electric power stored in said storage device; and a controller that sends signals to said first and second motor-driving circuits to cause said first motor-driving circuit to substantially disconnect the electromagnetic coupling of said first rotor with said second rotor in said first motor, and said controller causes said second motor-driving circuit to supply electric power stored in said storage device to said second motor when said residual capacity is greater than a predetermined value.

14. The power output apparatus in accordance with claim 13, wherein said third rotor is mounted on said first rotor connected with said output shaft.

* * * * *